(12) United States Patent
Kim et al.

(10) Patent No.: US 11,156,874 B2
(45) Date of Patent: Oct. 26, 2021

(54) LIQUID CRYSTAL PHOTOALIGNMENT AGENT AND LIQUID CRYSTAL DISPLAY INCLUDING THE SAME

(71) Applicant: Samsung Display Co., Ltd., Yongin-si (KR)

(72) Inventors: Yeon Cu Kim, Yongin-si (KR); Ki Chul Shin, Seongnam-si (KR); Soon Joon Rho, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/556,474

(22) Filed: Aug. 30, 2019

(65) Prior Publication Data

US 2020/0073182 A1 Mar. 5, 2020

(30) Foreign Application Priority Data

Aug. 30, 2018 (KR) .................. 10-2018-0102626

(51) Int. Cl.
*G02F 1/1337* (2006.01)
*C08L 79/08* (2006.01)
(Continued)

(52) U.S. Cl.
CPC ........ *G02F 1/133723* (2013.01); *C08L 33/10* (2013.01); *C08L 79/08* (2013.01);
(Continued)

(58) Field of Classification Search
CPC ............ C09K 2323/00; C09K 2323/02; C09K 2323/027; C08G 73/106; C08G 73/1025;
(Continued)

(56) References Cited

FOREIGN PATENT DOCUMENTS

KR    100189538 B1    6/1999
KR    100782436 B1    12/2007
(Continued)

OTHER PUBLICATIONS

Toshihiko Matsumoto et al., "Alicyclic polyimides—a colorless and thermally stable polymer for opto-electronic devices," Journal of Physics: Conference Series, 2009, vol. 187, pp. 1-11.

*Primary Examiner* — Ruiyun Zhang
(74) *Attorney, Agent, or Firm* — Cantor Colburn LLP

(57) ABSTRACT

A liquid crystal photoalignment agent includes: a copolymer of diamine and dianhydride; and a compound Formula 1 below, wherein an amount of the compound of Formula 1 is less than about 10 weight %, based on a total weight of the liquid crystal photoalignment agent:

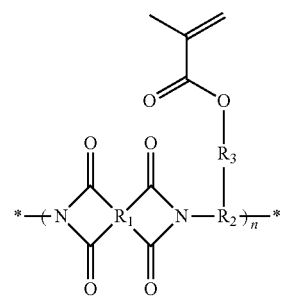

[Formula 1]

$R_1$ is a substituted or unsubstituted tetravalent organic group derived from an acid dianhydride, wherein the acid dianhydride is at least one of an aliphatic cyclic acid dianhydride or an aromatic acid dianhydride, $R_2$ is a substituted or unsubstituted trivalent organic group derived from an aromatic diamine, at least one of $R_1$ and $R_2$ is substituted with (Continued)

$CF_3$ or a silyl group, $R_3$ is a residue of a compound including a substituted or unsubstituted aromatic group with a carbon number that is equal to or greater than 6, n is 1 to 5, and * represents a point of attachment.

19 Claims, 9 Drawing Sheets

(51) Int. Cl.
    *C08L 33/10*     (2006.01)
    *C08G 73/10*     (2006.01)

(52) U.S. Cl.
    CPC ........ *C08G 73/106* (2013.01); *C08L 2203/16* (2013.01); *C08L 2203/20* (2013.01); *C09K 2323/00* (2020.08); *C09K 2323/02* (2020.08); *C09K 2323/027* (2020.08)

(58) Field of Classification Search
    CPC .... C08L 79/08; C08L 79/085; C08L 2203/16; C08L 2203/20; C08F 283/04; G02F 1/133723; G02F 1/133711; G02F 1/133788
    USPC ..... 428/1.1, 1.2, 1.25, 1.26, 473.5; 349/123, 349/135; 252/299.4
    See application file for complete search history.

(56) References Cited

FOREIGN PATENT DOCUMENTS

| | | | |
|---|---|---|---|
| KR | 101212674 B1 | 12/2012 | |
| KR | 101657102 B1 | 9/2016 | |
| WO | WO-2015182894 A1 * | 12/2015 | ........... C07C 211/50 |

* cited by examiner

Before Bending

After Bending

LIQUID CRYSTAL PHOTOALIGNMENT AGENT AND LIQUID CRYSTAL DISPLAY INCLUDING THE SAME

This application claims priority to Korean Patent Application No. 10-2018-0102626, filed in the Korean Intellectual Property Office on Aug. 30, 2018, and all the benefits accruing therefrom under 35 U.S.C. § 119, the contents of which in its entirety is herein incorporated by reference.

BACKGROUND

(a) Field

This disclosure relates to a liquid crystal photoalignment agent and a liquid crystal display including the same. In particular, the disclosure relates to a liquid crystal photoalignment agent for polymerization of a methacrylate group without the need for a photoinitiator, and to a liquid crystal display including the same.

(b) Description of the Related Art

A liquid crystal display includes two display panels including field generating electrodes, such as a pixel electrode and a common electrode, and a liquid crystal layer provided between the display panels.

In the liquid crystal display, a voltage is applied to the field generating electrodes to form an electric field on the liquid crystal layer. The electric field determines the alignment of liquid crystal molecules included in the liquid crystal layer, and controls polarization of incident light to thus display an image.

A liquid crystal composition in the liquid crystal display plays an important role in obtaining desired images, by controlling transmittance of light. In particular, the content of the liquid crystal composition may be designed to provide various characteristics such as a low voltage driving, a high-voltage voltage holding ratio (VHR), a wide viewing angle characteristic, a wide operational temperature range, and a high-speed response, depending on the type of liquid crystal display.

The response speed of the liquid crystal display may be increased by initially aligning the liquid crystal molecules so that they may have a pretilt. A method of aligning liquid crystal molecules to have a pretilt may include exposing a prepolymer to ultraviolet light at a desired voltage to polymerize the prepolymer. There remains a need for improved methods of aligning liquid crystal molecules so that they have a pretilt.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a liquid crystal photoalignment agent capable of independently inducing polymerization of a methacrylate group without the need for a photoinitiator, and forming a protrusion, and a liquid crystal display including the same.

An exemplary embodiment provides a liquid crystal photoalignment agent including: a copolymer of diamine and dianhydride; and a compound of Formula 1 below, wherein an amount of the compound of Formula 1 is less than about 10 weight percent (wt %), based on a total weight of the liquid crystal photoalignment agent.

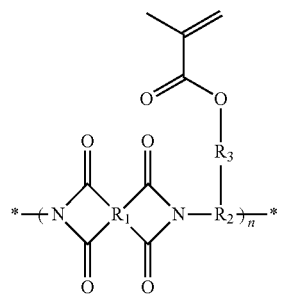

[Formula 1]

Herein, $R_1$ is a substituted or unsubstituted tetravalent organic group derived from an acid dianhydride, wherein the acid dianhydride is at least one of an aliphatic cyclic acid dianhydride or an aromatic acid dianhydride, $R_2$ is a substituted or unsubstituted trivalent organic group derived from an aromatic diamine, at least one of $R_1$ and $R_2$ is substituted with $CF_3$ or a silyl group, $R_3$ is a residue of a compound including a substituted or unsubstituted aromatic group having a carbon number that is equal to or greater than 6, n is 1 to 5, and * represents a point of attachment.

The copolymer of diamine and dianhydride may be hydrophilic, and the compound of Formula 1 may be hydrophobic.

The copolymer of diamine and dianhydride may not be miscible with the compound of Formula 1.

The photoalignment agent includes a base structure including the copolymer of diamine and dianhydride, and the compound of Formula 1 may be bound to the surface of the base structure and may be in a form of an island shape on the surface of the base structure.

In Formula 1,

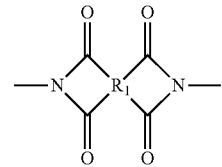

may be one of Formula 2-1 or Formula 2-2:

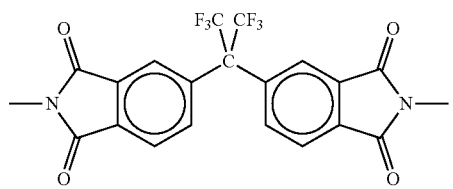

[Formula 2-1]

[Formula 2-2]

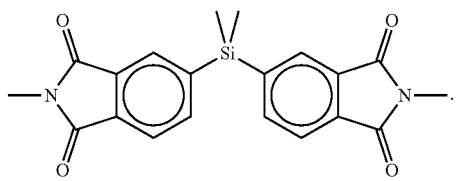

$R_2$ may be one of Formulae 3-1 to 3-7:

[Formula 3-1]

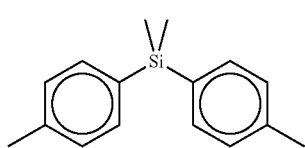

[Formula 3-2]

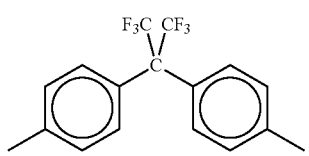

[Formula 3-3]

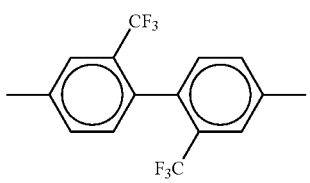

[Formula 3-4]

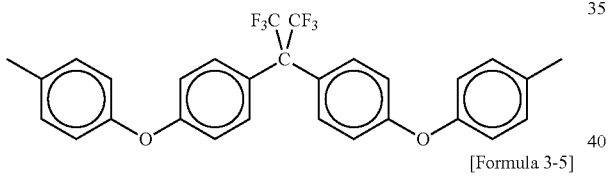

[Formula 3-5]

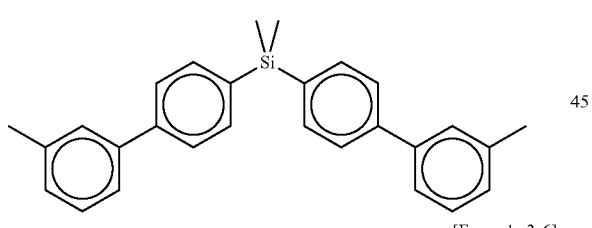

[Formula 3-6]

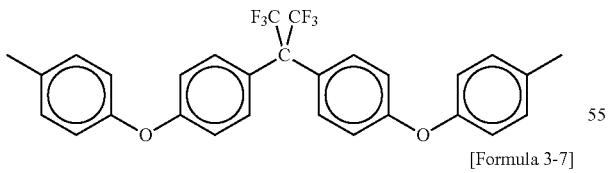

[Formula 3-7]

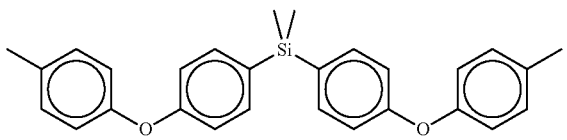

In Formulae 3-1 to 3-7, the point of attachment to $R_3$ of Formula 1 may be a carbon of a benzene ring of Formulae 3-1 to 3-7. The carbon may be a secondary carbon.

The compound of Formula 1 may further include a group of Formula 4 at a terminal end thereof:

[Formula 4]

$R_3$ may be one of a residue of compounds of Formulae 5-1 to 5-4:

[Formula 5-1]

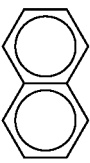

[Formula 5-2]

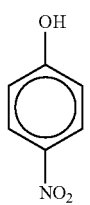

[Formula 5-3]

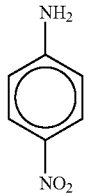

[Formula 5-4]

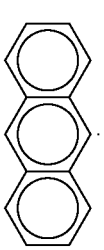

In Formulae 5-1 and 5-4, the point of attachment to R2 may be an outer carbon of a benzene ring, in Formula 5-2, the point of attachment to R2 may be —OH or —NO$_2$, and in Formula 5-3, the point of attachment to R2 may be —NH$_2$ or —NO$_2$.

$R_3$ may be a residue of a compound having an absorption wavelength of 300 nanometers (nm) to 400 nm.

The compound of Formula 1 may be a compound of Formula 1-1:
[Formula 1-1]
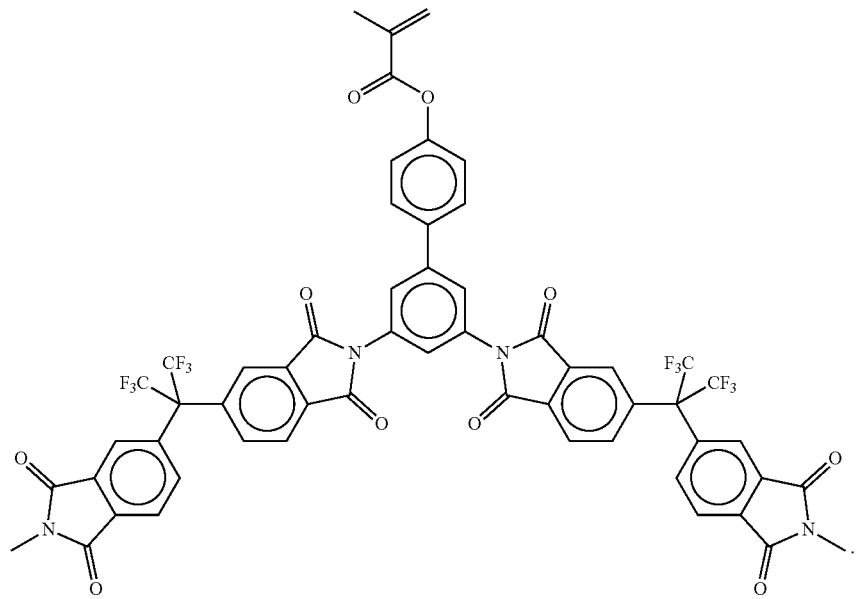
The compound of Formula 1 may be a compound of Formula 1-2, wherein the group
of Formula 1-2 may react with the copolymer of diamine and dianhydride to form a reaction product and may be bound thereto:
[Formula 1-2]
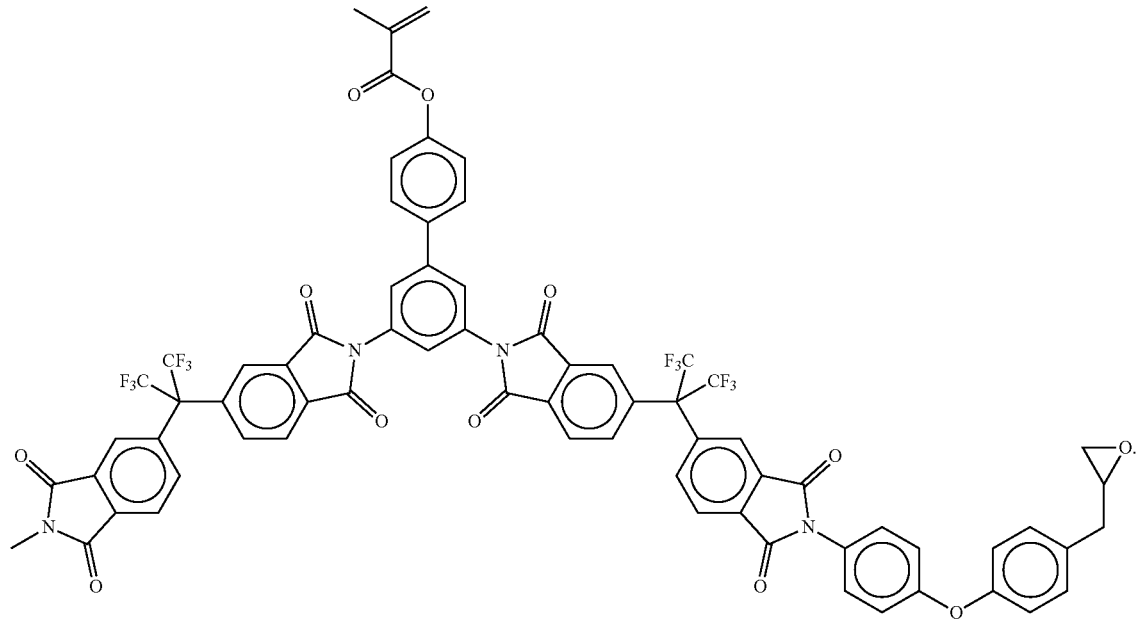

The liquid crystal photoalignment agent may not include a photoinitiator, i.e., a photoinitiator compound may be absent.

Another embodiment provides a liquid crystal display including: a first substrate and a second substrate facing each other; a liquid crystal layer disposed between the first substrate and the second substrate; and a plurality of protrusions disposed between the first substrate and the liquid crystal layer, wherein the plurality of protrusions include a photopolymerization product of a compound of Formula 1 below:

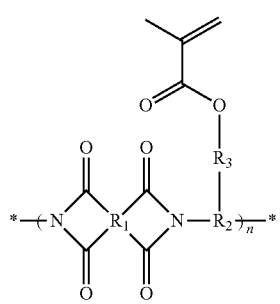

[Formula 1]

wherein $R_1$ is a substituted or unsubstituted tetravalent organic group derived from an acid dianhydride, wherein the acid dianhydride is at least one of an aliphatic cyclic acid dianhydride or an aromatic acid dianhydride, $R_2$ is a substituted or unsubstituted trivalent organic group derived from an aromatic diamine, at least one of $R_1$ and $R_2$ is substituted with $CF_3$ or a silyl group, $R_3$ is residue of a compound including a substituted or unsubstituted aromatic group having a carbon number that is equal to or greater than 6, n is 1 to 5, and * represents a point of attachment.

The liquid crystal layer may not include a photoalignment agent.

A protrusion may not be disposed between the second substrate and the liquid crystal layer.

The liquid crystal display includes a first alignment layer disposed between the first substrate and the liquid crystal layer and a second alignment layer disposed between the second substrate and the liquid crystal layer, wherein the plurality of protrusions is disposed between the first alignment layer and the liquid crystal layer, and the first alignment layer and the second alignment layer do not include a photoinitiator.

In Formula 1,

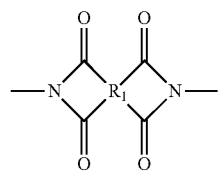

may be one of Formula 2-1 or Formula 2-2.

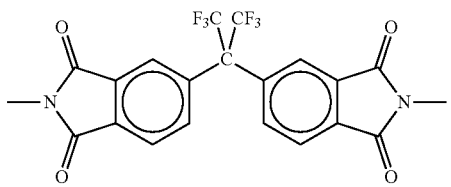

[Formula 2-1]

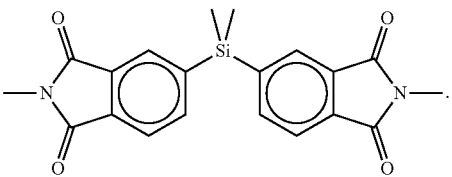

[Formula 2-2]

$R_2$ may be one of Formulae 3-1 to 3-7:

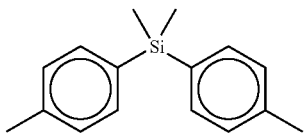

[Formula 3-1]

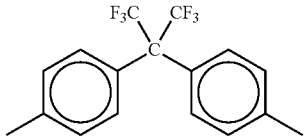

[Formula 3-2]

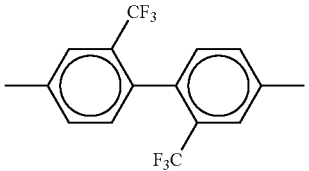

[Formula 3-3]

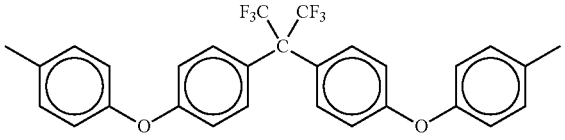

[Formula 3-4]

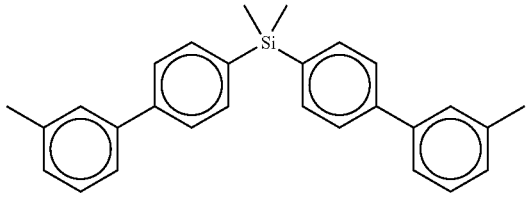

[Formula 3-5]

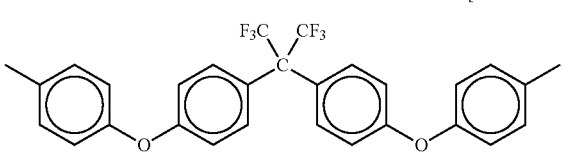

[Formula 3-6]

-continued
[Formula 3-7]
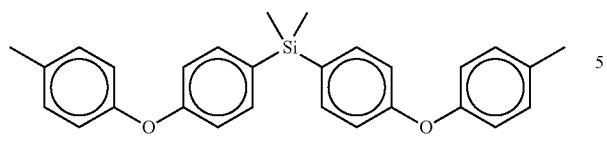
In Formulae 3-1 to 3-7, the point of attachment to $R_3$ of Formula 1 may be a carbon of a benzene ring of Formulae 3-1 to 3-7.
The compound of Formula 1 may further include a group of Formula 4 at a terminal end thereof:
[Formula 4]
A compound of Formula 1 may be a compound of Formula 1-1 or a compound of Formula 1-2:
[Formula 1-1]
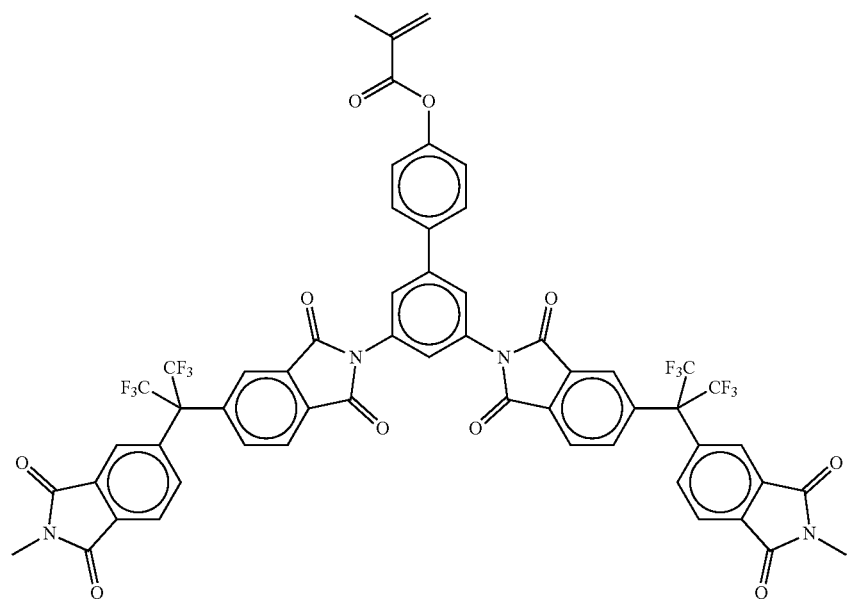
[Formula 1-2]
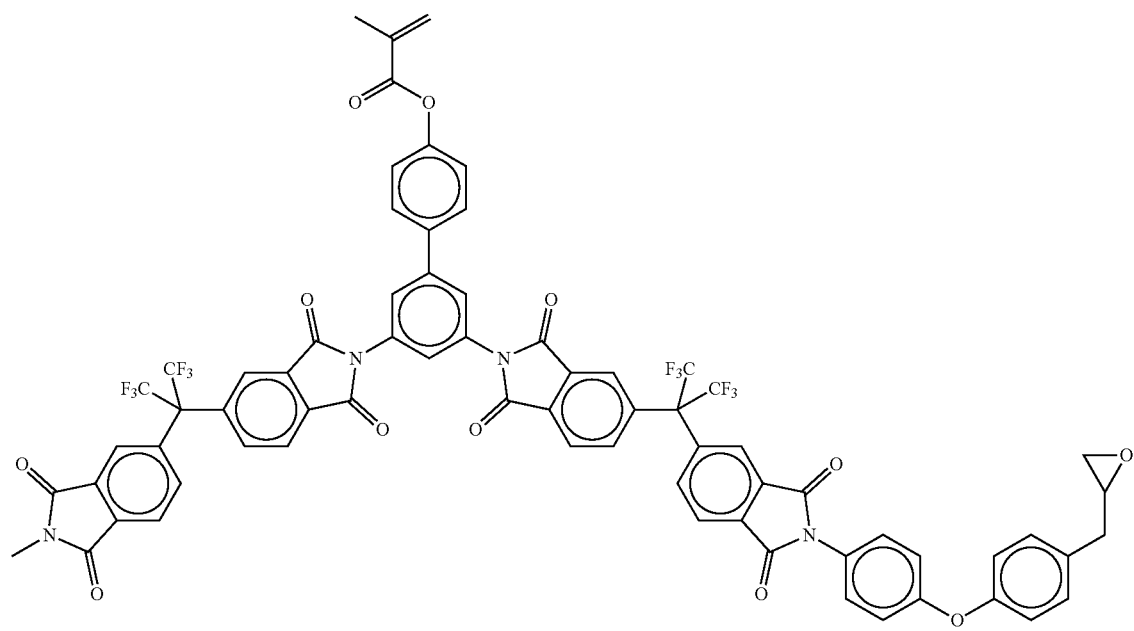

According to the exemplary embodiments, a liquid crystal photoalignment agent for inducing polymerization of a methacrylate group and forming a protrusion, without a photoinitiator, and a liquid crystal display including the same, are provided.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
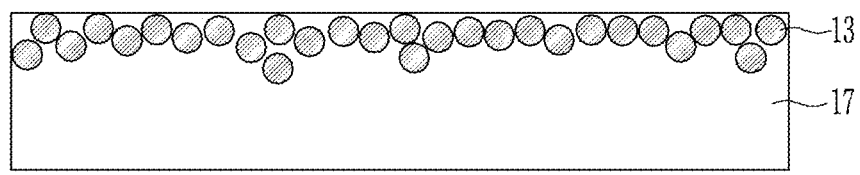
FIG. 1 is an illustration of a cross-sectional view of a photoalignment agent, according to an exemplary embodiment.

The present invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The size and thickness of each element or configuration shown in the drawings are arbitrarily shown for better understanding and ease of description, and the invention is not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The phrase "on a plane" means viewing the object portion from the top, and the phrase "on a cross-section" means viewing a cross-section of which the object portion is vertically cut from the side.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "alkyl" means a straight or branched chain saturated aliphatic hydrocarbon having the specified number of carbon atoms, specifically 1 to 12 carbon atoms, more specifically 1 to 6 carbon atoms. Alkyl groups include, for example, groups having from 1 to 50 carbon atoms (C1 to C50 alkyl).

The term "alkenyl" means a straight or branched chain, monovalent hydrocarbon group having at least one carbon-carbon double bond (e.g., ethenyl (—HC═CH2)). Alkenyl groups include, for example, groups having from 2 to 50 carbon atoms (C2 to C50 alkyl).

The term "alkynyl" means a straight or branched chain, monovalent hydrocarbon group having at least one carbon-carbon triple bond (e.g., ethynyl). Alkynyl groups include, for example, groups having from 2 to 50 carbon atoms (C2 to C50 alkyl).

The term "aryl" refers to a hydrocarbon group having an aromatic ring, and includes monocyclic and polycyclic hydrocarbons wherein the additional ring(s) of the polycyclic hydrocarbon may be aromatic or nonaromatic (e.g., phenyl or naphthyl).

"Arylalkyl" refers to a monovalent carbocyclic ring group that includes one or more aromatic rings. "Heteroaryl" means a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, Spiro, or fused. The heteroatom(s) are generally independently selected from nitrogen (N), oxygen (O), P (phosphorus), and sulfur (S).

The term "silyl," by itself or as part of another group, refers to an (—Si(R)$_x$H$_y$) moiety, wherein 1<x<3 and y=3−x, and wherein each R is independently selected from an alkyl, an alkenyl, an alkynyl, an aryl, an arylalkyl, and a heteroaryl group described above. The term "aromatic" means an organic compound or group comprising at least one unsaturated cyclic group having delocalized pi electrons. The term encompasses both hydrocarbon aromatic compounds and heteroaromatic compounds.

"Amine" has the general formula NRR, wherein each R is independently hydrogen, an alkyl group, or an aryl group.

"Aromatic diamine" refers to an aromatic compound including two amine groups.

A bond to another atom is indicated by a dash "—" or "—*".

A liquid crystal photoalignment agent according to an exemplary embodiment will now be described.

The liquid crystal photoalignment agent includes a copolymer of diamine and dianhydride, and a compound of Formula 1, and an amount of the compound of Formula 1 may be less than 10 weight percent (wt %), based on a total weight of the liquid crystal photoalignment agent.

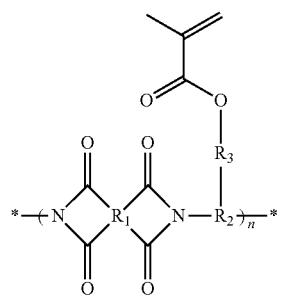

[Formula 1]

Herein, $R_1$ is a substituted or unsubstituted tetravalent organic group derived from an acid dianhydride, where the acid dianhydride is at least one of an aliphatic cyclic acid dianhydride or an aromatic acid dianhydride, $R_2$ is a substituted or unsubstituted trivalent organic group derived from an aromatic diamine, at least one of $R_1$ and $R_2$ is substituted with $CF_3$ or a silyl group, $R_3$ is a residue of a compound including a substituted or unsubstituted aromatic group having a carbon number that is equal to or greater than 6, n is 1 to 5, and * represents a point of attachment.

Regarding the photoalignment agent, the copolymer of diamine and dianhydride is hydrophilic, and the compound of Formula 1 is hydrophobic.

Therefore, the copolymer of diamine and dianhydride and the compound of Formula 1 are not miscible with each other. That is, the photoalignment agent may include a base structure including the copolymer of diamine and dianhydride, and an island shape bound to the surface of the base structure, and generated by the compound of Formula 1. In other words, the photoalignment agent comprises a base structure comprising the copolymer of diamine and dianhydride, and the compound of Formula 1 is bound to the surface of the base structure and forms an island shape FIG. 1 is an illustration showing a cross-sectional view of a photoalignment agent according to an exemplary embodiment, and FIG. 2 is an illustration of a surface of a photoalignment agent according to the exemplary embodiment in FIG. 1.

Figure 2:
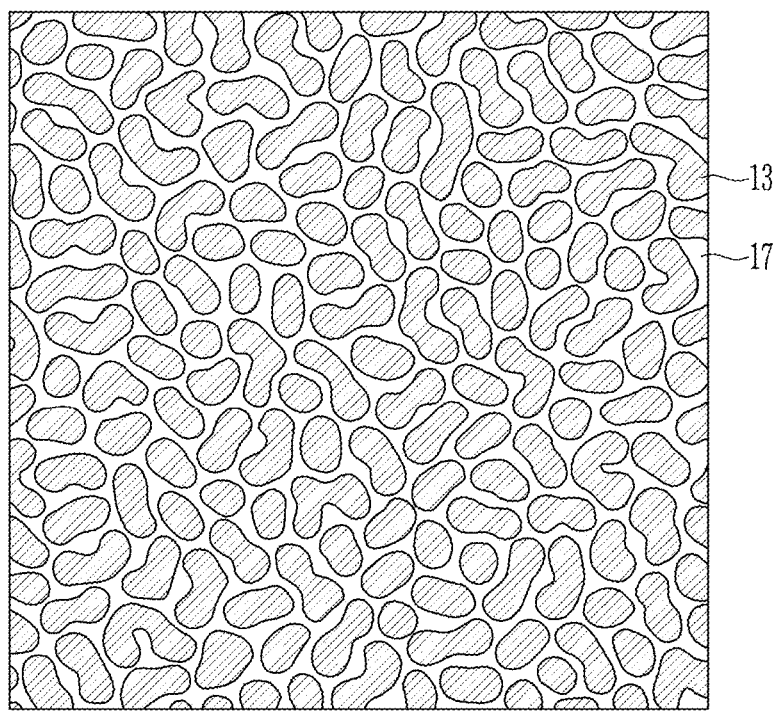
FIG. 2 is an illustration of a surface of a photoalignment agent, according to the exemplary embodiment of FIG. 1.

Referring to FIG. 1 and FIG. 2, the compound of Formula 1 is provided in the form of islands 13 on the base structure 17 made of the copolymer of diamine and dianhydride. That is, the base structure 17 is hydrophilic and the islands 13 (including the compound of Formula 1) are hydrophobic, and as a result, the base structure 17 is not miscible (i.e., is not mixed) with the islands 13. The display panel of a liquid crystal display is provided on a bottom surface of the base structure 17. The display panel has a polarity and is hydrophilic, while ambient air containing N2 and O2 is generally non-polar and has an affinity for hydrophobic structures. Therefore, a thick layer of the island 13 is provided on the upper surface of the hydrophobic base 17.

The compound of Formula 1 is bound to the copolymer of diamine and dianhydride in the form of islands 13 and is provided on the base structure 17 made of the copolymer of diamine and dianhydride. As a result, the polymerization of the methacrylate group present in Formula 1 may be induced without the need for a photoinitiator.

In other words, in a general liquid crystal display, a protrusion formed on the alignment layer induces the pretilt of liquid crystal molecules in the liquid crystal layer. To facilitate the formation of the protrusion, the alignment layer or the liquid crystal layer includes a photoinitiator. When ultraviolet (UV) light is irradiated, the photoinitiator induces the polymerization of the methacrylate groups and forms a protrusion.

For example, Reaction Formula 1 shows the polymerization of methacrylate by a photoinitiator. The photoinitiator used in Reaction Formula 1 is, as an example, a 2-hydroxy-4'-(2-hydroxyethoxy)-2-methylpropiophenone derivative. Referring to Reaction Formula 1, the polymerization of methacrylate is induced by the photoinitiator.

[Reaction Formula 1]

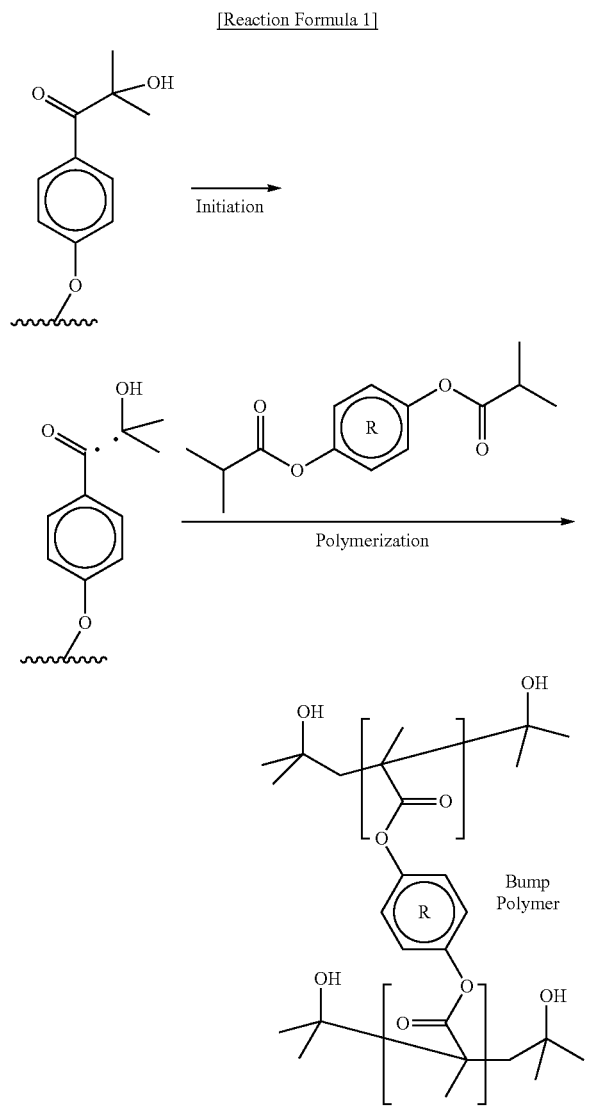

However, in a process of irradiating UV light for the formation of a pretilt, the photoinitiator is not completely exhausted (i.e., used up), and as a result, a substantial amount thereof remains in the liquid crystal layer. The remaining photoinitiator is decomposed by blue light during operation of the liquid crystal display, so ion adsorption performance may be lost, and color stains may be generated on the display panel.

Reaction Formula 2 shows a reaction for the decomposition of the remaining photoinitiator by blue light and corresponding loss of ion adsorption performance.

[Reaction Formula 2]

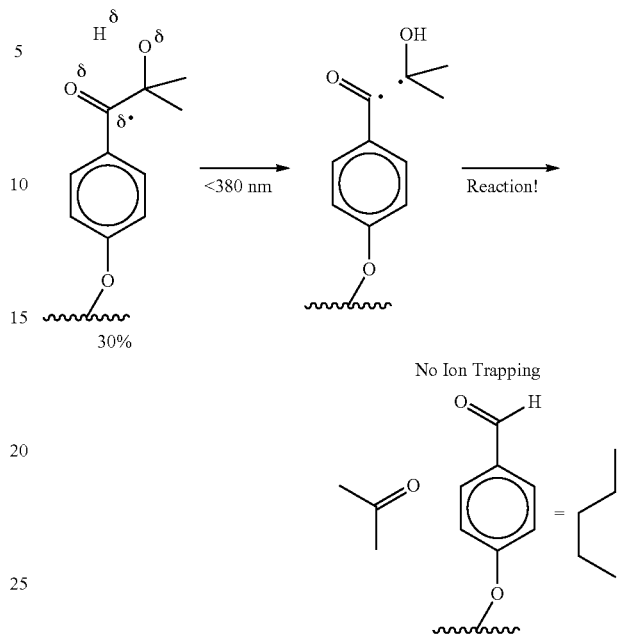

Referring to Reaction Formula 2, at least 30% of the total initial amount of photoinitiator does not react and remains. The remaining, unreacted photoinitiator is decomposed by blue light and loses ion adsorption performance. However, the photoinitiator is decomposed by a wavelength that is equal to or less than 380 nm so it is not decomposed by red light or green light. Therefore, the degree of ion adsorption differs between red/green/blue regions of the liquid crystal display. That is, ions are well adsorbed by the photoinitiator in the red/green regions, whereas the photoinitiator is decomposed by blue light and the ions are not adsorbed in the blue region, thereby generating color stains in the display panel.

Therefore, in the case of the display device in which the liquid crystal layer or the alignment layer includes a photoinitiator, it is difficult to obtain uniform display quality. However, the methacrylate does not generate a sufficient reaction without the photoinitiator, so in spite of the problems associated with the photoinitiator, the photoinitiator is still used to prepare the liquid crystal display.

However, the exemplary liquid crystal photoalignment agent described herein includes a copolymer of diamine and dianhydride, and a compound of Formula 1. In this instance, the copolymer of diamine and dianhydride is hydrophilic, and the compound of Formula 1 is hydrophobic. The compound of Formula 1 includes a methacrylate group, and as shown in FIG. 1 and FIG. 2, the compound of Formula 1 is combined in the photoalignment agent to form an island. Hence, a concentration of the methacrylate groups is increased in the island 13, and the methacrylate groups are polymerized when the UV light is irradiated, without an additional photoinitiator. Therefore, a protrusion may be formed on the alignment layer without the photoinitiator, and the generation of color stains caused by the decomposition of the photoinitiator may be prevented.

[Formula 1]

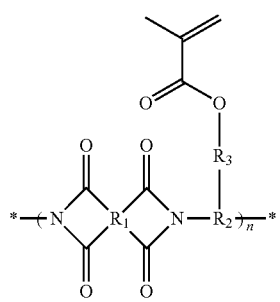

In Formula 1, at least one of $R_1$ and $R_2$ is substituted with $CF_3$ or a silyl group. Therefore, the compound of Formula 1 becomes hydrophobic by the presence of the $CF_3$ or the silyl group.

In detail, $R_2$ may be a substituted or unsubstituted aromatic group having a carbon number of equal to or greater than 6. For example, the aromatic group may have a carbon number of 6 to 30, or for example, a carbon number of 6 to 20. When $R_1$ is substituted with $CF_3$ or a silyl group, R may or may not be substituted with $CF_3$ or a silyl group, for example R may be a phenyl group. In an embodiment, $R_2$ may be one of Formulae 3-1 to 3-7.

[Formula 3-1]

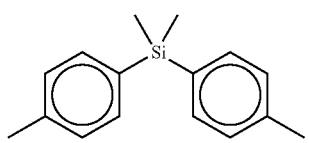

[Formula 3-2]

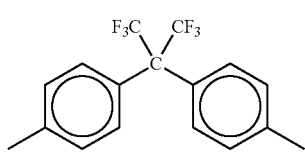

[Formula 3-3]

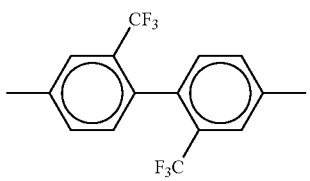

[Formula 3-4]

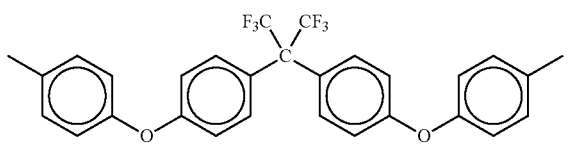

[Formula 3-5]

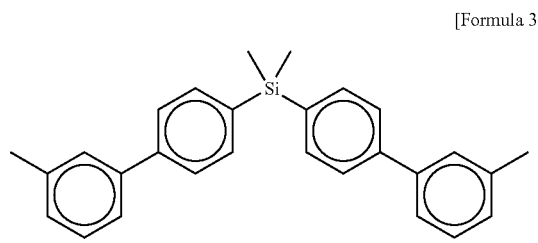

[Formula 3-6]

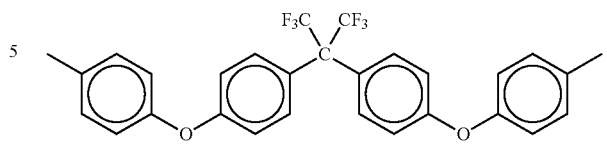

[Formula 3-7]

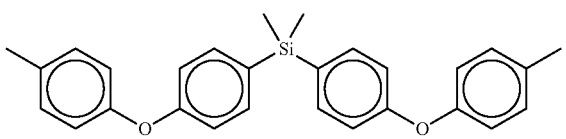

In Formulae 3-1 to 3-7, a point of attachment to $R_3$ of Formula 1 may be one a carbon of a benzene ring in Formulae 3-1 to 3-7. In an aspect the carbon is a secondary carbon.

Formulae 3-1 to 3-7 include $CF_3$ or a silyl group. Therefore, the compound of Formula 1 including one of Formulae 3-1 to 3-7 is hydrophobic. However, Formulae 3-1 to 3-7 are examples of $R_2$, and they are not limited thereto.

Further, from among the compound of Formula 1,

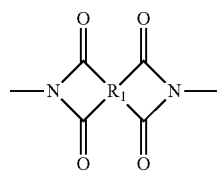

may be one of Formulae 2-1 and 2-2.

[Formula 2-1]

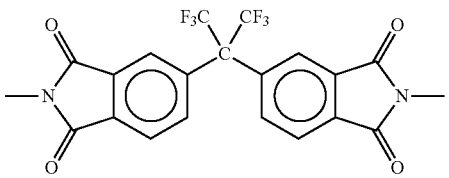

[Formula 2-2]

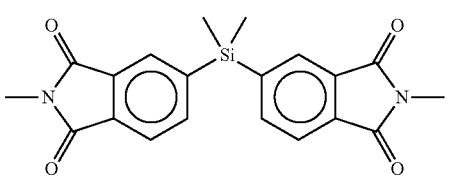

Formula 2-1 and Formula 2-2 include $CF_3$ or a silyl group. Hence, the corresponding compound of Formula 1 is hydrophobic. However, Formulae 2-1 and 2-2 are examples, and

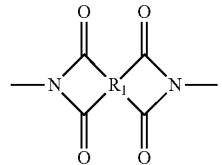

is not limited thereto.

In addition, in Formula 1, $R_3$ includes a residue of is a residue of a compound comprising a substituted or unsubstituted aromatic group having a carbon number that is equal to or greater than 6, and n is 1 to 5.

Regarding the liquid crystal alignment agent according to an exemplary embodiment, the copolymer of diamine and dianhydride may include an aliphatic compound. This is because the aliphatic compound has high transmittance in a wavelength region that is wider in range than that of the aromatic compound.

In this instance, the compound of Formula 1 includes an aromatic compound, so phase separation may be well induced in the liquid crystal photoalignment agent. That is, the aliphatic compound is bound to another aliphatic compound, and the aromatic compound is bound to another aromatic compound.

For example, $R_3$ may be a substituted or unsubstituted phenyl group, in particular an unsubstituted phenyl group, or $R_3$ may be one of the compounds of Formulae 5-1 to 5-4.

[Formula 5-1]

[Formula 5-2]

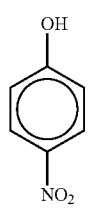

[Formula 5-3]

[Formula 5-4]

In Formulae 5-1 and 5-4, with the point of attachment to $R_2$ may be an outer carbon of a benzene ring.

In Formula 5-2, with the point of attachment to $R_2$ may be the —OH group or —$NO_2$ group.

In Formula 5-3, the point of attachment to $R_2$ may be the —$NH_2$ group or the —$NO_2$ group.

A photoalignment process for forming a pretilt in a liquid crystal display uses the UV rays of 300 nm to 400 nm. Therefore, it is desirable for $R_3$ to include the compound with the absorption wavelength of 300 nm to 400 nm. The compounds of Formulae 5-1 to 5-4 are desirable since their absorption wavelength is 300 nm to 400 nm.

Further, $R_1$ of Formula 1 may be a tetravalent organic group derived from the aromatic acid dianhydride. That is, Formula 1 may include an aromatic compound and may not include an aliphatic compound. In this case, the phase separation effect from the copolymer of diamine and dianhydride including an aliphatic compound may become greater.

The compound of Formula 1 may further include a group of Formula 4 at one or more terminal ends.

[Formula 4]

In this instance, the group of Formula 4 functions to form a reaction product between the copolymer of diamine and dianhydride and the compound of Formula 1. That is, the compound of Formula 4 reacts with the copolymer of diamine and dianhydride, a base structure of the liquid crystal photoalignment agent, to thus form a covalent bond between the compound of Formula 1 and the copolymer of diamine and dianhydride.

In detail, the compound of Formula 1 may be a compound of Formula 1-1 or a compound of Formula 1-2.
[Formula 1-1]
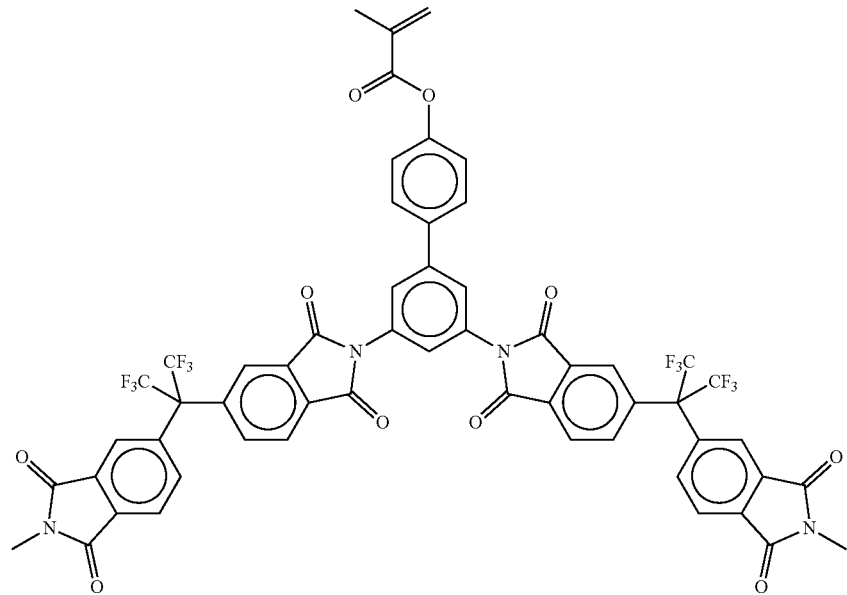
[Formula 1-2]
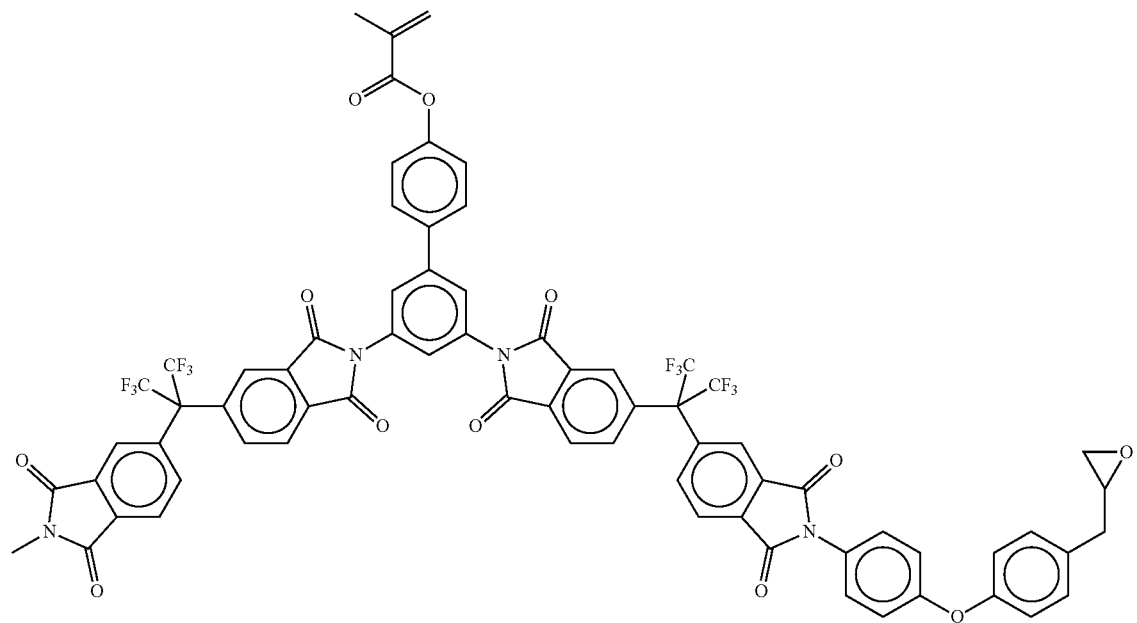

In Formula 1-1 and Formula 1-2, the CF₃ group allows Formula 1 to be hydrophobic. The methacrylate group reacts with a neighboring methacrylate group of the compound of Formula 1-1 or Formula 1-2 to form a polymer protrusion.

In Formula 1-1 or Formula 1-2, the structure

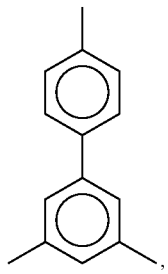

in which two benzene rings are connected, absorbs light having a wavelength of 300 nm to 400 nm to activate a methacrylate group.

The group

of Formula 1-2 reacts with the copolymer of diamine and dianhydride of the liquid crystal photoalignment agent and is bound thereto.

In detail,

of Formula 1-2 may form a covalent bond with the copolymer of diamine and dianhydride in the liquid crystal photoalignment agent through a reaction of Reaction Formula 3.

[Reaction Formula 3]

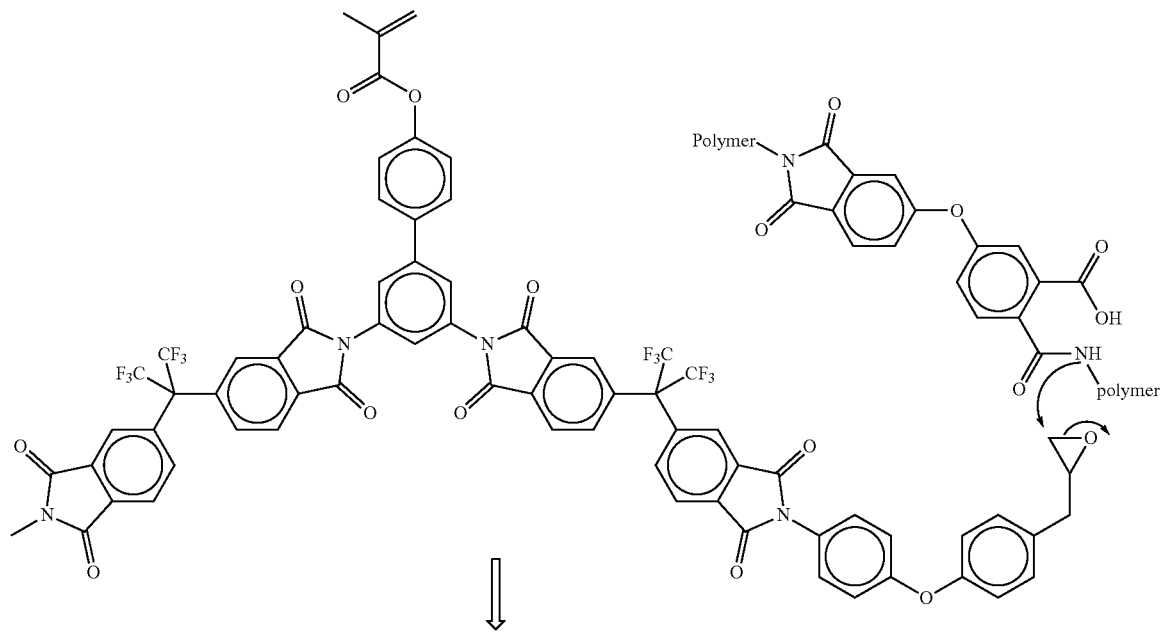

-continued

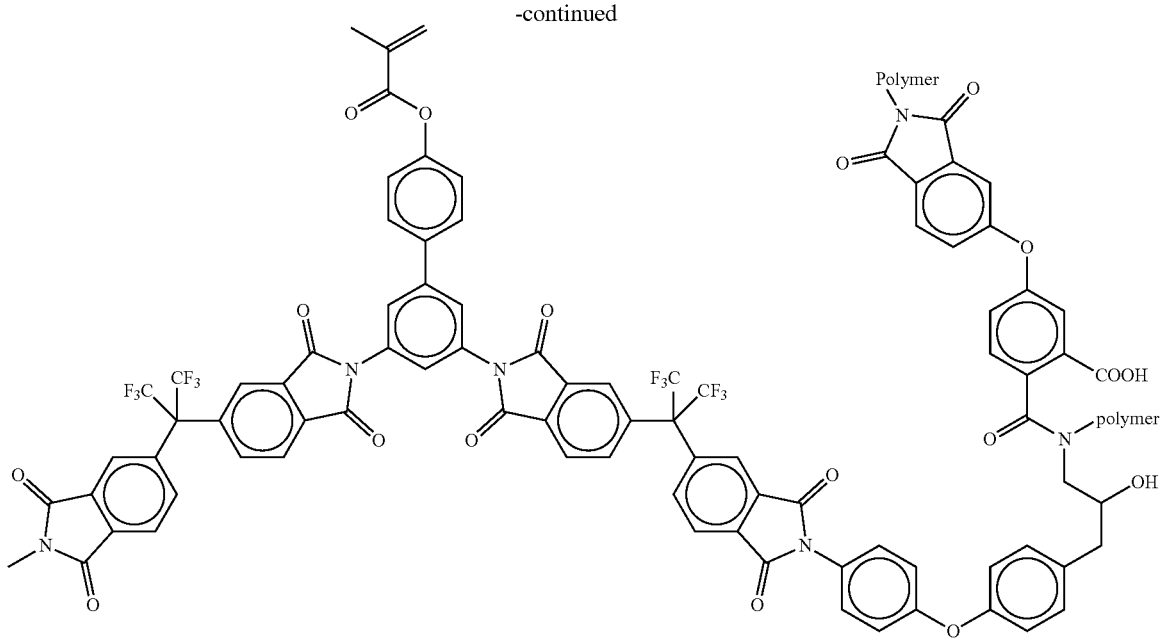

Regarding the liquid crystal photoalignment agent, the amount of the compound of Formula 1 may be less than about 10 wt %, less than about 8 wt %, less than about 5 wt %, or less than about 3 wt %, or less than about 1 wt %, based upon a total weight of the liquid crystal photoalignment agent. When the content of the compound of Formula 1 is greater than 10 wt %, it may influence the alignment characteristics of the alignment layer.

The compound including a methacrylate group and having the structure of Formula 1 is bound to the base structure in an island shape, so the liquid crystal photoalignment agent may induce sufficient photopolymerization even when only a small amount is used. That is, regarding the liquid crystal photoalignment agent, the content of the compound of may be less than 5 wt %, or less than about 3 wt %, or less than about 1 wt %. It is difficult to polymerize the methacrylate groups without a photoinitiator when the amount of conventional photoalignment agent is less than 5%, but in the case of the liquid crystal photoalignment agent according to an exemplary embodiment, the compound of Formula 1 is densely provided due to the phase separation caused by the difference in hydrophilic/hydrophobic characteristics, so sufficient polymerization may be generated even when a small amount of the compound of Formula 1 is used.

As described, the liquid crystal photoalignment agent according to an exemplary embodiment includes a hydrophilic copolymer of diamine and dianhydride, and the hydrophobic compound of Formula 1. Therefore, the hydrophobic compound of Formula 1 is combined with and provided on the hydrophilic base, and the compound of Formula 1 includes a methacrylate group, thereby enabling the photopolymerization of the methacrylate without a photoinitiator. Accordingly, the color stains attributed to remaining photoinitiator, caused by light absorption thereto, may be prevented.

A liquid crystal display according to an exemplary embodiment will now be described with reference to drawings. The liquid crystal display includes an alignment layer formed by using the above-described liquid crystal photoalignment agent.

Figure 3:
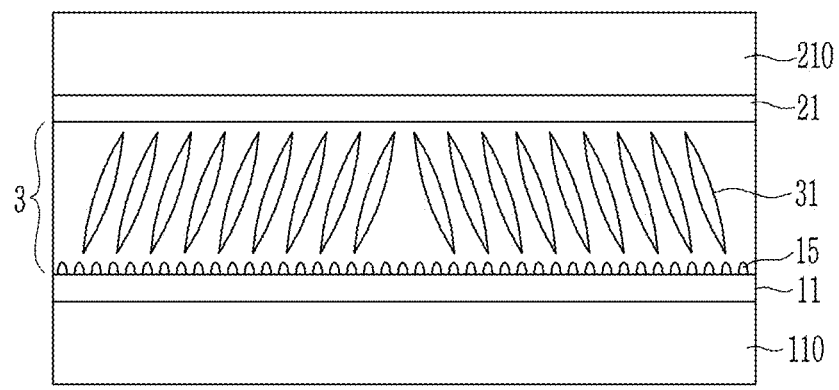
FIG. 3 is an illustration of a liquid crystal display according to an exemplary embodiment.

FIG. 3 shows a liquid crystal display according to an exemplary embodiment. Referring to FIG. 3, the liquid crystal display includes a first substrate 110 and a second substrate 210 facing each other, a liquid crystal layer 3 disposed between the first substrate 110 and the second substrate 210, and a plurality of protrusions 15 disposed between the first substrate 110 and the liquid crystal layer 3, and the plurality of protrusions 15 are formed by a polymer generated by photopolymerizing the compound of Formula 1 given below.

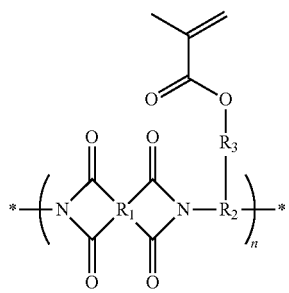

[Formula 1]

Herein, $R_1$ is a substituted or unsubstituted tetravalent organic group derived from the acid dianhydride, where the acid dianhydride is at least one of the aliphatic cyclic acid dianhydride or the aromatic acid dianhydride, $R_2$ is a substituted or unsubstituted trivalent organic group derived from the aromatic diamine, at least one of $R_1$ and $R_2$ is substituted with $CF_3$ or a silyl group, $R_3$ is a residue of a compound including a substituted or unsubstituted aromatic group having a carbon number that is equal to or greater than 6, n is 1 to 5, and * represents a point of attachment.

Further, a first alignment layer 11 is disposed between the liquid crystal layer 3 and the first substrate 110, a second alignment layer 21 is disposed between the liquid crystal layer 3 and the second substrate 210, and the first alignment layer 11 and the second alignment layer 21 may include a polyimide.

Regarding the liquid crystal display according to the present exemplary embodiment, the liquid crystal layer 3, the first alignment layer 11, and the second alignment layer 21 do not include a photoinitiator. The compound of Formula 1 is bound in an island shape, so the liquid crystal photoalignment agent may be photopolymerized without a photoinitiator, and the liquid crystal display having the protrusions 15 formed by photopolymerization of the liquid crystal photoalignment agent, also do not include a photoinitiator.

Further, referring to FIG. 3, no protrusions are disposed between the second substrate 210 and the liquid crystal layer 3. That is, the liquid crystal molecules 31 disposed adjacent to, and in the vicinity of the first substrate 110 have a pretilt, while the liquid crystal molecules 31 disposed adjacent to, and in the vicinity of the second substrate 210 do not have a pretilt.

Figure 4A:
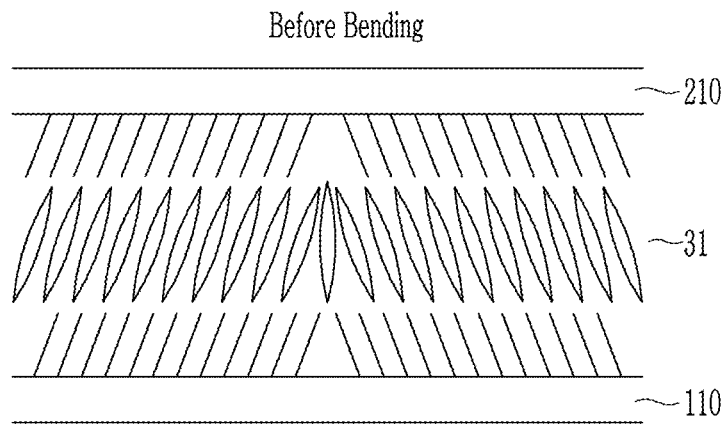
FIGS. 4A and 4B show the movement of liquid crystal molecules before and after bending a liquid crystal display according to a comparative example.
Figure 4B:
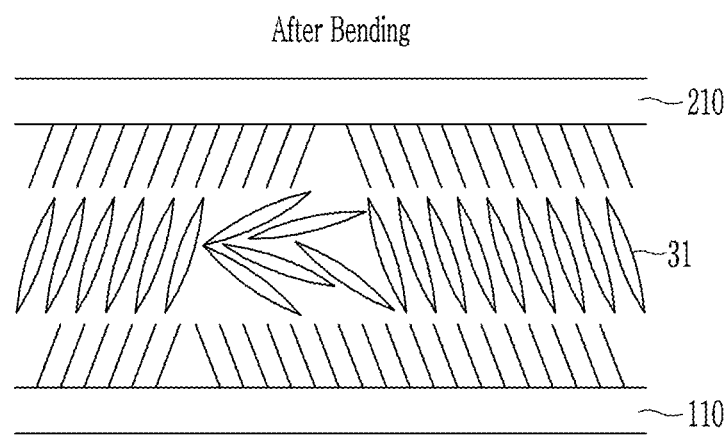
Figure 5A:
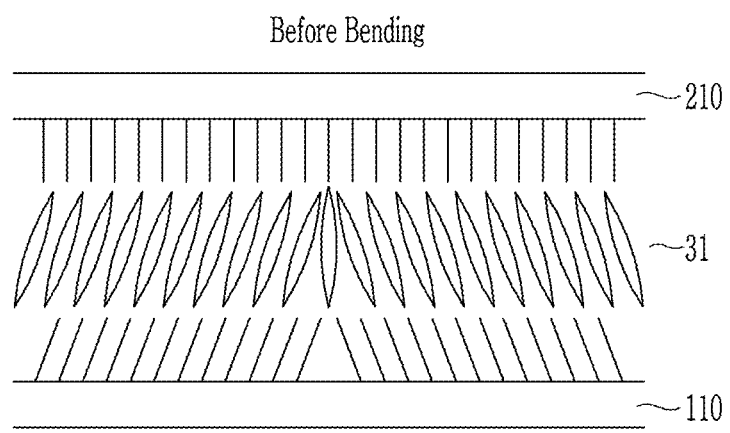
FIGS. 5A and 5B show the movement of liquid crystal molecules before and after bending a liquid crystal display according to an exemplary embodiment.
Figure 5B:
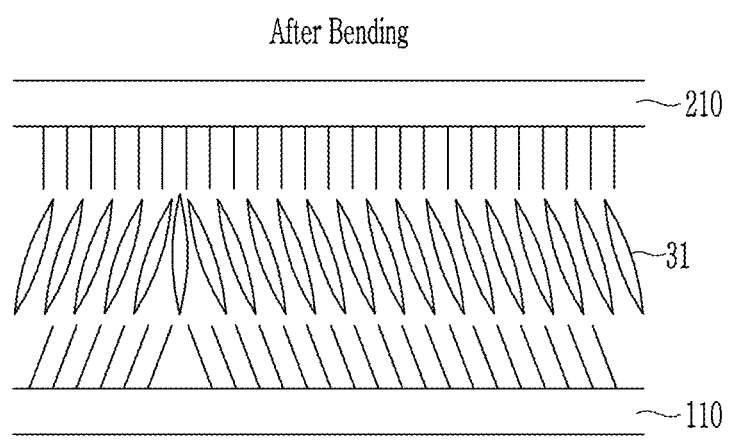

FIGS. 4A and 4B illustrate the movement of liquid crystal molecules before/after the bending of a liquid crystal display according to a comparative example, and FIGS. 5A and 5B illustrate the movement of liquid crystal molecules before/after the bending of a liquid crystal display according to an exemplary embodiment.

Referring to FIGS. 4A and 4B, when a pretilt is respectively formed on the liquid crystal molecules 31 of the first substrate and the second substrate, a direction of the liquid crystal alignment on the first substrate and the second substrate becomes different due to a misalignment which occurs when the substrates are bent. Therefore, the arrangement of the liquid crystal molecules 31 becomes disordered and stains are generated.

However, referring to FIGS. 5A and 5B, when the pretilt is formed on the first substrate, when a misalignment is generated due to bending of the substrates, the liquid crystal molecules are influenced by the pretilt on the first substrate such that when a misalignment is generated, the alignment of the liquid crystal molecules is not disordered. Hence, the arrangement state of liquid crystals molecules before/after bending may be maintained.

In the exemplary liquid crystal display, the descriptions of Formula 1 correspond to the above-provided descriptions. That is, in Formula 1,

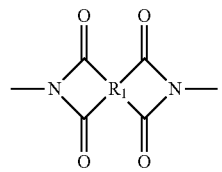

may be one of Formula 2-1 or Formula 2-2.

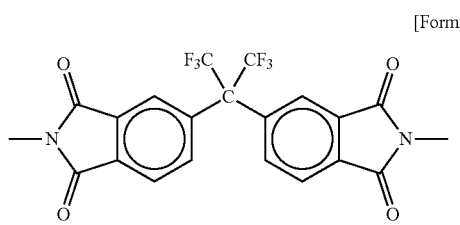

[Formula 2-1]

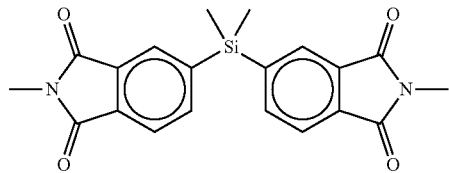

[Formula 2-2]

In Formula 1, $R_2$ may be one of Formulae 3-1 to 3-7.

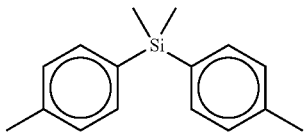

[Formula 3-1]

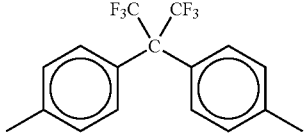

[Formula 3-2]

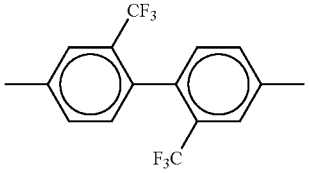

[Formula 3-3]

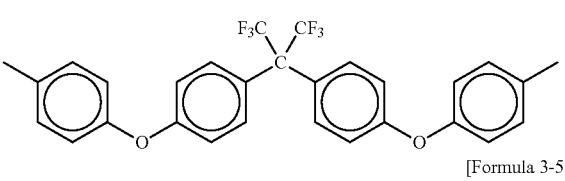

[Formula 3-4]

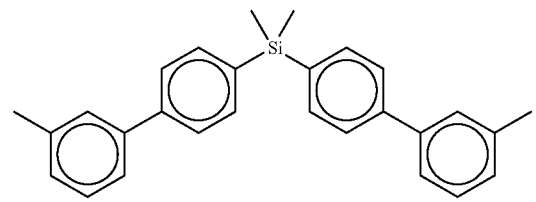

[Formula 3-5]

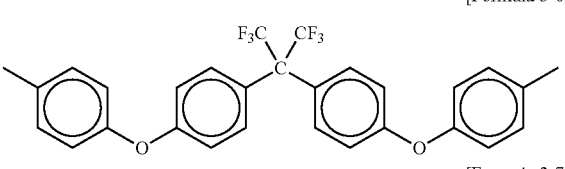

[Formula 3-6]

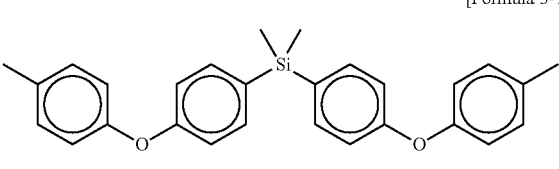

[Formula 3-7]

In Formulae 3-1 to 3-7, the point of attachment to $R_3$ of Formula 1 may be a carbon of a benzene ring of Formulae 3-1 to 3-7. The carbon may be a secondary carbon.

The compound of Formula 1 may further include a group of Formula 4 at a terminal end thereof.

[Formula 4]

In Formula 1, R₃ may be a residue of one of Formulae 5-1 to 5-4.

[Formula 5-1]

[Formula 5-2]

[Formula 5-3]

[Formula 5-4]

In Formulae 5-1 and 5-4, the point of attachment to R2 may be an outer carbon of a benzene ring.

In Formula 5-2, the point of attachment to R2 may be —OH group or —NO₂ group.

In Formula 5-3, the point of attachment to R2 may be —NH₂ group or —NO₂ group.

In Formula 1, R₃ may be a residue of a compound having an absorption wavelength of 300 nm to 400 nm.

In detail, the compound of Formula 1 may be the compound of Formula 1-1 or the compound of Formula 1-2.

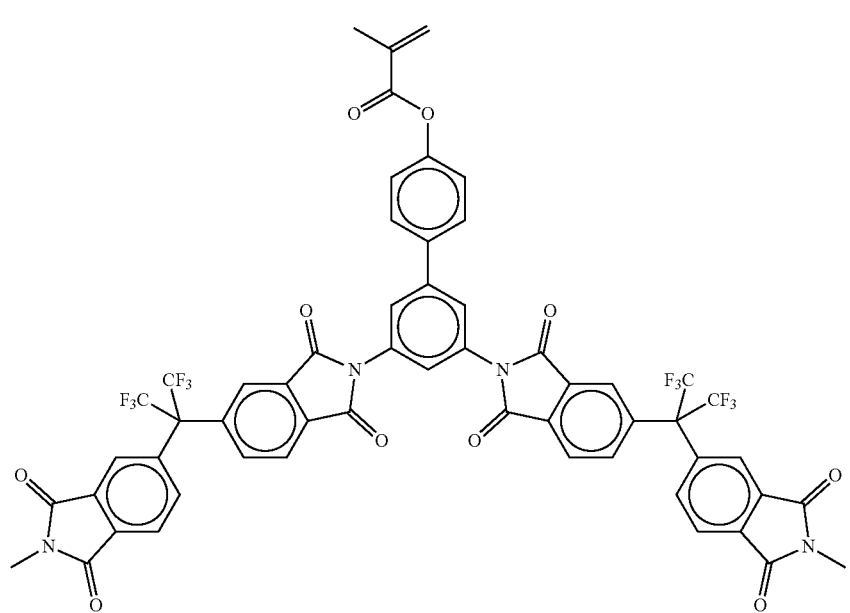

[Formula 1-1]

[Formula 1-2]

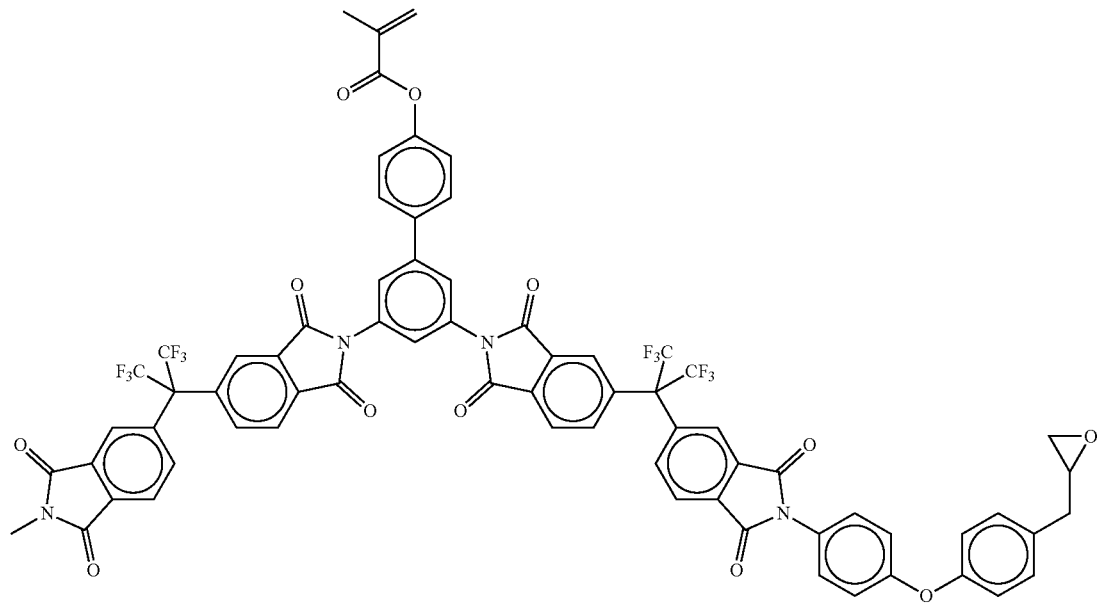

Descriptions of Formula 1 correspond to the above descriptions provided with reference to the liquid crystal photoalignment agent. Additional detailed descriptions regarding the same constituent elements are not provided.

Figure 6:
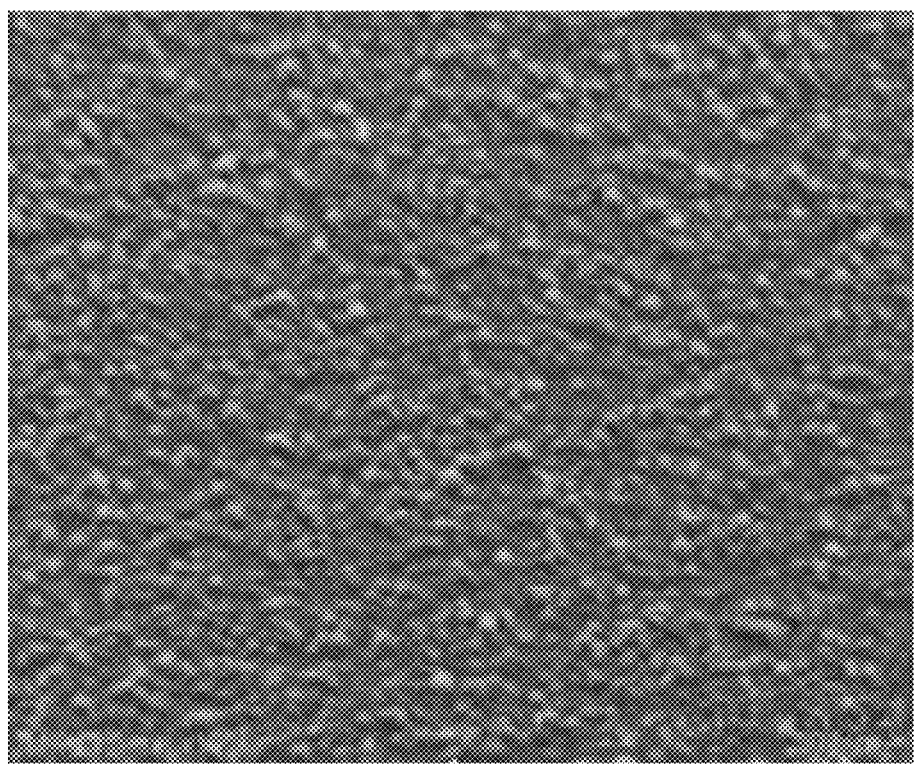
FIG. 6 is a scanning electron microscope (SEM) image of protrusions formed in a liquid crystal display without the use of a photoinitiator, according to an exemplary embodiment.
Figure 7:
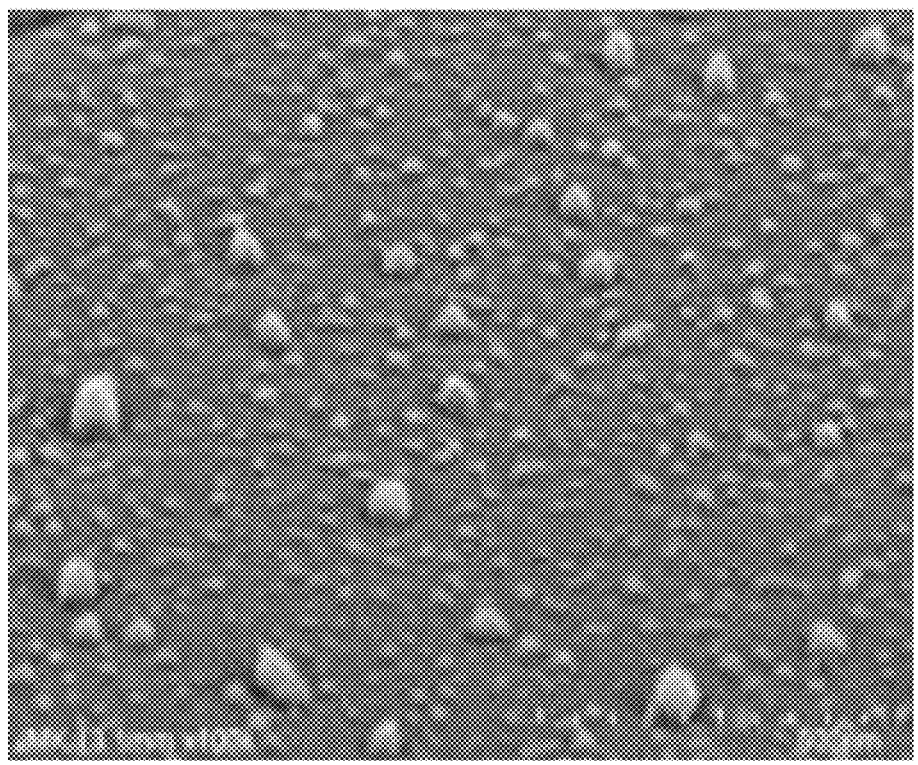
FIG. 7 is an SEM image of protrusions formed in a liquid crystal display using a photoinitiator, according to a comparative example.

FIG. 6 is an SEM image of protrusions formed in a liquid crystal display according to an exemplary embodiment in the absence of (without) a photoinitiator. FIG. 7 shows an SEM image of protrusions formed in a liquid crystal display according to a comparative example using a photoinitiator.

Comparing FIG. 6 and FIG. 7, the protrusions in the exemplary liquid crystal display shown with reference to FIG. 6 (including no photoinitiator) are uniform and have a smaller size. In FIG. 7, the protrusions are greater in size and are sparsely distributed.

In the case according to an exemplary embodiment using no photoinitiator, uniform photopolymerization is induced across an entire region of the liquid crystal display, so the protrusions are uniformly formed. Without being limited by theory, it is understood that because the photopolymerization is generated in many regions, an amount of the methacrylate groups polymerized in a single protrusion is less and as a result, small protrusions are formed.

However, in the case of a comparative example using a photoinitiator (refer to FIG. 7), the photopolymerization is induced only in the region in which the photoinitiator has reacted. Therefore, the photopolymerization is only induced in a region where the photoinitiator is combined with the methacrylate, and thus protrusions are not uniformly formed. In addition, the region where photopolymerization is generated is smaller as compared to FIG. 6, accordingly, the amount of methacrylate groups polymerized to provide a single protrusion increases, and as a result larger size protrusions are formed.

A detailed structure of a pixel of a liquid crystal display according to an exemplary embodiment will now be described A structure to be described hereinafter will be an example, and the detailed structure is not limited thereto.

Figure 8:
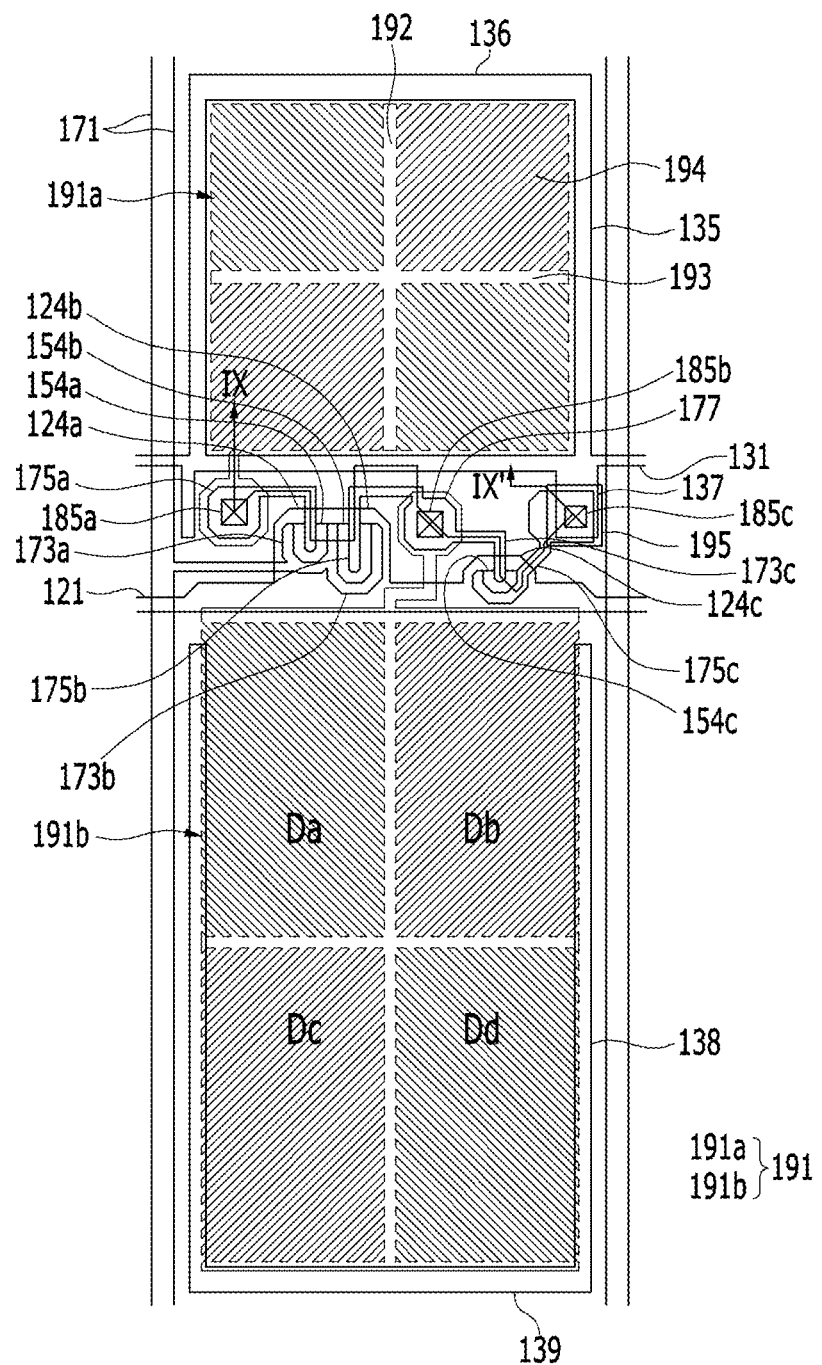
FIG. 8 is a plan view of a pixel of a liquid crystal display according to an exemplary embodiment.
Figure 9:
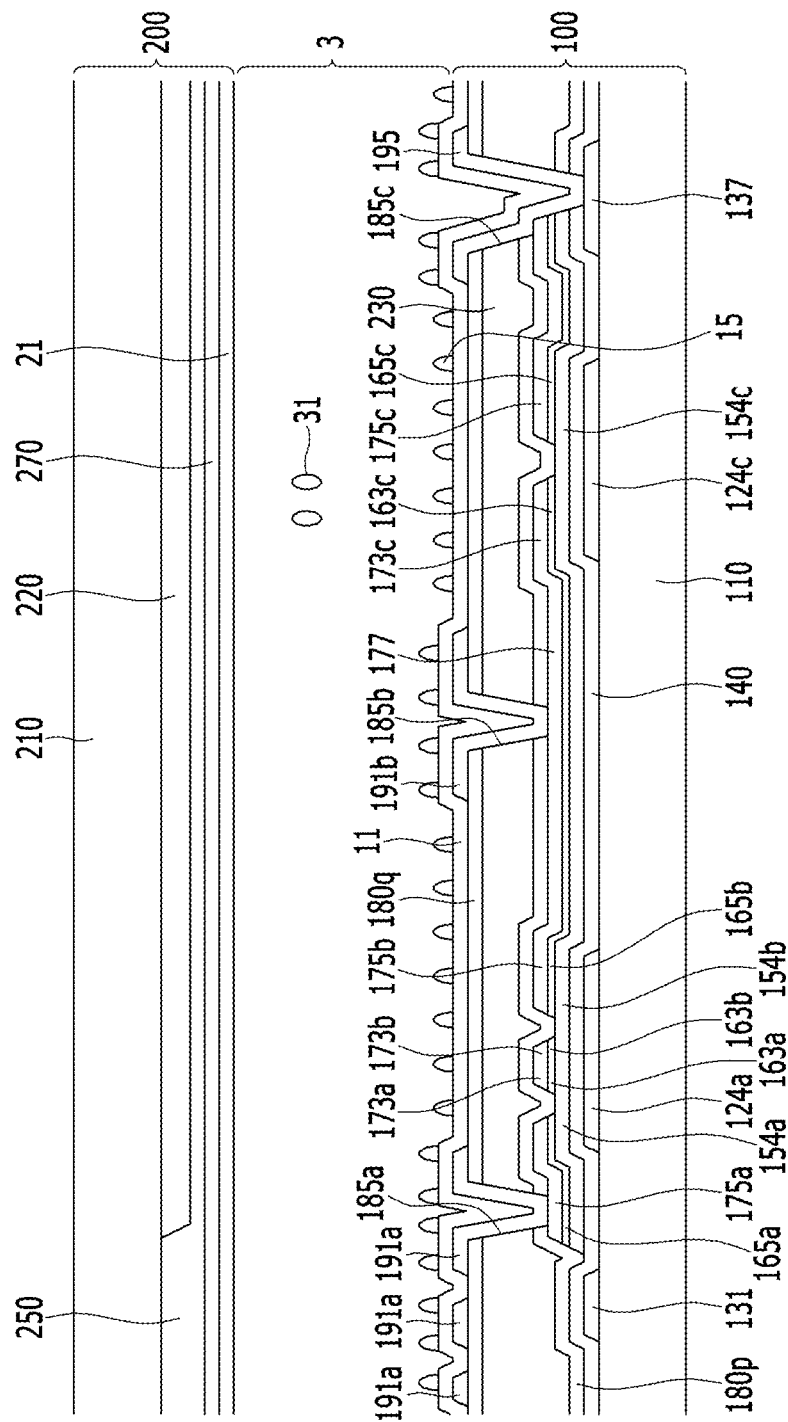
FIG. 9 is a cross-sectional view with respect to line IX-IX' in FIG. 8.

FIG. 8 is an illustration of a plan view of a pixel of a liquid crystal display according to an exemplary embodiment of, and FIG. 9 illustrates a cross-sectional view with respect to line IX-IX in FIG. 8.

A first display panel 100 will now be described.

A gate conductor including a gate line 121 and a voltage-dividing reference voltage line 131 is provided on a first substrate 110 made of a transparent material, e.g., glass or plastic.

The gate line 121 includes a first gate electrode 124a, a second gate electrode 124b, and a third gate electrode 124c.

The voltage-dividing reference voltage line 131 includes first storage electrodes 135 and 136 and a reference electrode 137. Although not connected to the voltage-dividing reference voltage line 131, second storage electrodes 138 and 139 may be provided to overlap a second sub-pixel electrode 191b.

A gate insulating layer 140 is provided on the gate line 121 and the voltage-dividing reference voltage line 131.

A first semiconductor layer 154a, a second semiconductor layer 154b, and a third semiconductor layer 154c are provided on the gate insulating layer 140. Ohmic contacts 163a, 165a, 163b, 165b, 163c, and 165c are provided on the semiconductor layers 154a, 154b, and 154c.

A data conductor including a data line 171 connected to a first source electrode 173a and a second source electrode 173b, a first drain electrode 175a, a second drain electrode 175b, a third source electrode 173c, and a third drain electrode 175c are provided on the ohmic contacts 163a, 165a, 163b, 165b, 163c, and 165c, and the gate insulating layer 140.

The first gate electrode 124a, the first source electrode 173a, and the first drain electrode 175a configure a first thin film transistor together with the first semiconductor layer 154a. The second gate electrode 124b, the second source electrode 173b, and the second drain electrode 175b configure a second thin film transistor together with the second semiconductor layer 154b. The third gate electrode 124c, the third source electrode 173c, and the third drain electrode 175c configure a third thin film transistor together with the third semiconductor layer 154c.

The second drain electrode 175b is connected to the third source electrode 173c, and includes a widely extended extension 177.

A first passivation layer 180p is provided on the data conductors 171, 173c, 175a, 175b, and 175c, and the semiconductor layers 154a, 154b, and 154c.

A color filter 230 is provided on the first passivation layer 180p. The color filter 230 extends in a vertical direction along two adjacent data lines 171. An exemplary embodiment is described and illustrated as an example in which the color filter 230 is included in the first display panel 100, and without being limited to this, the color filter 230 may be included in the second display panel 200.

A second passivation layer 180q is provided on the color filter 230. The first passivation layer 180p and the second passivation layer 180q may include an inorganic insulating layer such as a silicon nitride or a silicon oxide.

The second passivation layer 180q prevents the color filter 230 from lifting, and suppresses contamination of the liquid crystal layer 3 caused by an organic material such as a solvent input from the color filter 230 to thereby prevent defects such as an afterimage that may be generated when a screen is driven.

The first passivation layer 180p and the second passivation layer 180q include a first contact hole 185a and a second contact hole 185b overlapping the first drain electrode 175a and the second drain electrode 175b, respectively.

The first passivation layer 180p, the second passivation layer 180q, and the gate insulating layer 140 include a third contact hole 185c overlapping part of the reference electrode 137 and part of the third drain electrode 175c, and the third contact hole 185c is covered by a connecting member 195. The connecting member 195 electrically connects the reference electrode 137 and the third drain electrode 175c overlapping the third contact hole 185c.

A pixel electrode 191 is provided on the second passivation layer 180q. The pixel electrode 191 is one of the field generating electrodes, and the pixel electrode 191 respectively includes a first sub-pixel electrode 191a and a second sub-pixel electrode 191b separated from each other with a gate line 121 therebetween and neighboring in a column direction with respect to the gate line 121.

The pixel electrode 191 may include a transparent material such as an indium tin oxide (ITO) and an indium zinc oxide (IZO).

The first sub-pixel electrode 191a and the second sub-pixel electrode 191b are quadrangular in shape, and respectively include a cross-shaped stem configured to have a horizontal stem 193 and a vertical stem 192 crossing the same. Further, the first sub-pixel electrode 191a and the second sub-pixel electrode 191b are respectively divided into a first sub-region (Da), a second sub-region (Db), a third sub-region (Dc), and a fourth sub-region (Dd) by the horizontal stem 193 and the vertical stem 192, and the sub-regions each (Da to Dd) include a plurality of fine branches 194.

The first sub-pixel electrode 191a and the second sub-pixel electrode 191b are respectively connected to the first drain electrode 175a and the second drain electrode 175b through the first contact hole 185a and the second contact hole 185b, and they receive a data voltage from the first drain electrode 175a and the second drain electrode 175b. In this instance, a portion of the data voltage applied to the second drain electrode 175b is divided through the third source electrode 173c, and a voltage applied to the first sub-pixel electrode 191a becomes higher than a voltage applied to the second sub-pixel electrode 191b.

The first sub-pixel electrode 191a and the second sub-pixel electrode 191b to which the data voltage is applied generate an electric field together with a common electrode 270 of the second display panel 200 to determine an alignment direction of the liquid crystal molecules 31 of the liquid crystal layer 3 between the two electrodes 191 and 270. According to the determined alignment direction of the liquid crystal molecules 31, luminance of light passing through the liquid crystal layer 3 becomes different.

The above-provided description of the thin film transistor and the pixel electrode 191 is an example, and the configuration of the thin film transistor and the design of the pixel electrode may be modified so as to improve lateral visibility.

A first alignment layer 11 is disposed between the pixel electrode 191 and the liquid crystal layer 3. The first alignment layer 11 may include a polyimide. The first alignment layer 11 does not include a photoinitiator. A plurality of protrusions 15 are disposed between the first alignment layer 11 and the liquid crystal layer 3. The plurality of protrusions 15 correspond to the above-provided description. That is, the plurality of protrusion 15 includes a polymer of the compound of Formula 1. The description of the compound of Formula 1 corresponds to the above-provided description, and so detailed description on regarding the same is omitted here.

The second display panel 200 will now be described.

A second substrate 210 is provided to overlap the first substrate 110 with a gap therebetween. A light blocking member 220 is provided between the second substrate 210 and the liquid crystal layer 3. The light blocking member 220 is provided on the second display panel 200 so that the light blocking member 220 may overlap the region where the data line 171 of the first display panel 100 is provided and the region where the thin film transistor is provided. An exemplary embodiment in which the light blocking member 220 is included in the second display panel 200 is described and illustrated herein, but exemplary embodiments are not limited thereto, and the light blocking member may be included in the first display panel 100.

An overcoat 250 is provided between the light blocking member 220 and the liquid crystal layer 3. The overcoat 250 may be omitted.

The common electrode 270, which is one of field generating electrodes, is provided between the overcoat 250 and the liquid crystal layer 3. The common electrode 270 generates an electric field together with the pixel electrode 191 of the first display panel 100 to determine the alignment direction of the liquid crystal molecules 31 of the liquid crystal layer 3.

The second alignment layer 21 is disposed between the common electrode 270 and the liquid crystal layer 3 and may include a polyimide. Further, the second alignment layer 21 does not include a photoinitiator.

The liquid crystal layer 3 includes liquid crystal molecules 31. The liquid crystal display does not include a photoinitiator, so there is no photoinitiator present in the liquid crystal layer 3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal photoalignment agent, comprising:
a copolymer of diamine and dianhydride; and
a compound of Formula 1,
wherein an amount of the compound of Formula 1 is less than about 10 weight percent, based on a total weight of the liquid crystal photoalignment agent:

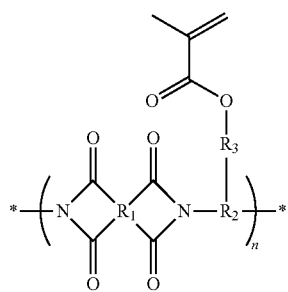

[Formula 1]

wherein
$R_1$ is a substituted or unsubstituted tetravalent organic group derived from an acid dianhydride, wherein the acid dianhydride is at least one of an aliphatic cyclic acid dianhydride or an aromatic acid dianhydride,
$R_2$ is a substituted or unsubstituted trivalent organic group derived from an aromatic diamine,
at least one of $R_1$ or $R_2$ is substituted with $CF_3$ or a silyl group,
$R_3$ is a residue of a compound comprising a substituted or unsubstituted aromatic group having a carbon number that is equal to or greater than 6,
n is 1 to 5, and
* represents a point of attachment, and
wherein the copolymer of diamine and dianhydride is not miscible with the compound of Formula 1.

2. The liquid crystal photoalignment agent of claim 1, wherein
the copolymer of diamine and dianhydride is hydrophilic, and
the compound of Formula 1 is hydrophobic.

3. A liquid crystal photoalignment agent, comprising:
a copolymer of diamine and dianhydride, and
a compound of Formula 1,
wherein an amount of the compound of Formula 1 is less than about 10 weight percent, based on a total weight of the liquid crystal photoalignment agent:

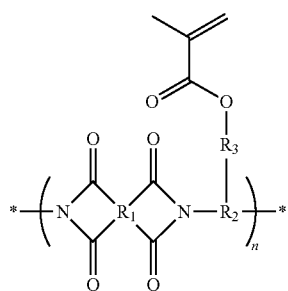

[Formula 1]

wherein,
$R_1$ is a substituted or unsubstituted tetravalent organic group derived from an acid dianhydride, wherein the acid dianhydride is at least one of an aliphatic cyclic acid dianhydride or an aromatic acid dianhydride,
$R_2$ is a substituted or unsubstituted trivalent organic group derived from an aromatic diamine,
at least one of $R_1$ or $R_2$ is substituted with $CF_3$ or a silyl group,
$R_3$ is a residue of a compound comprising a substituted or unsubstituted aromatic group having a carbon number that is equal to or greater than 6,
n is 1 to 5, and
* represents a point of attachment, and
wherein
the photoalignment agent comprises a base structure comprising the copolymer of diamine and dianhydride, and the compound of Formula 1 is bound to the surface of the base structure and is in a form of an island shape on the surface of the base structure.

4. The liquid crystal photoalignment agent of claim 1, wherein
in Formula 1, the moiety

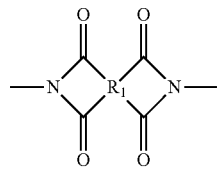

is one of Formula 2-1 to 2-2:

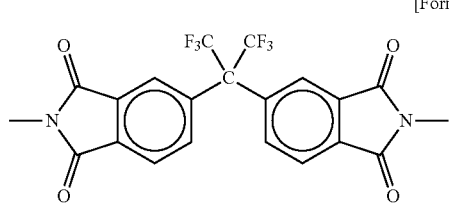

[Formula 2-1]

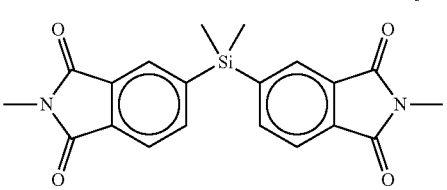

[Formula 2-2]

5. The liquid crystal photoalignment agent of claim 1, wherein
$R_2$ is one of a moiety of Formulae 3-1 to 3-7:

[Formula 3-1]

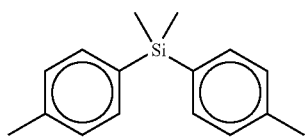

[Formula 3-2]

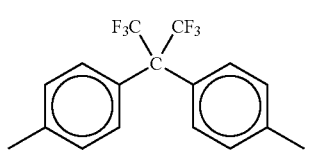

[Formula 3-3]

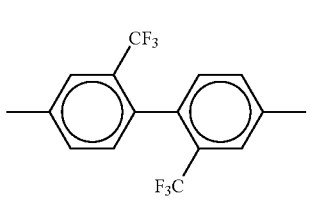

[Formula 3-4]

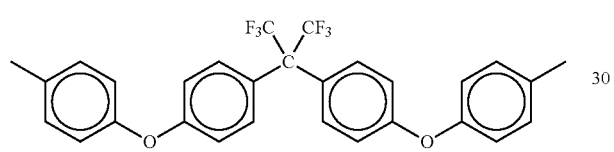

[Formula 3-5]

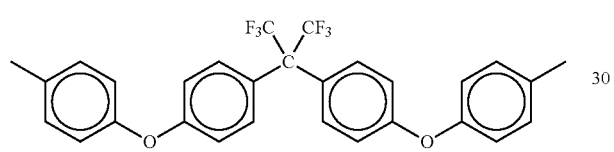

[Formula 3-6]

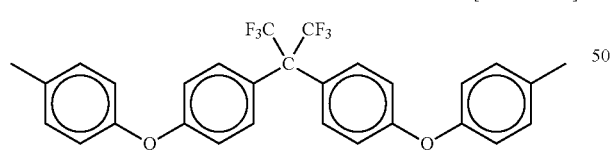

[Formula 3-7]

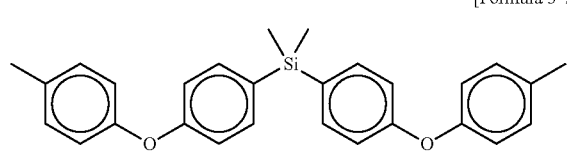

wherein in Formulae 3-1 to 3-7, an additional point of attachment to $R_3$ of Formula 1 is a carbon of a benzene ring of Formulae 3-1 to 3-7.

6. The liquid crystal photoalignment agent of claim 1, wherein
the compound of Formula 1 further comprises a group of Formula 4 at a terminal end thereof or both terminal ends thereof:

[Formula 4]

7. The liquid crystal photoalignment agent of claim 1, wherein
$R_3$ is one of a residue of a compound of Formula 5-1 or 5-4:

[Formula 5-1]

[Formula 5-4]

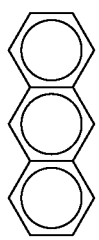

wherein, in Formulae 5-1 and 5-4, a point of attachment to $R_2$ is a secondary carbon of a first benzene ring and a point of attachment to the

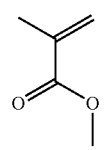

is a secondary carbon of a second benzene ring.

8. The liquid crystal photoalignment agent of claim 1, wherein
$R_3$ is a compound having an absorption wavelength of 300 nanometers to 400 nanometers.

9. The liquid crystal photoalignment agent of claim 1, wherein
the compound of Formula 1 is a compound of Formula 1-1
[Formula 1-1]
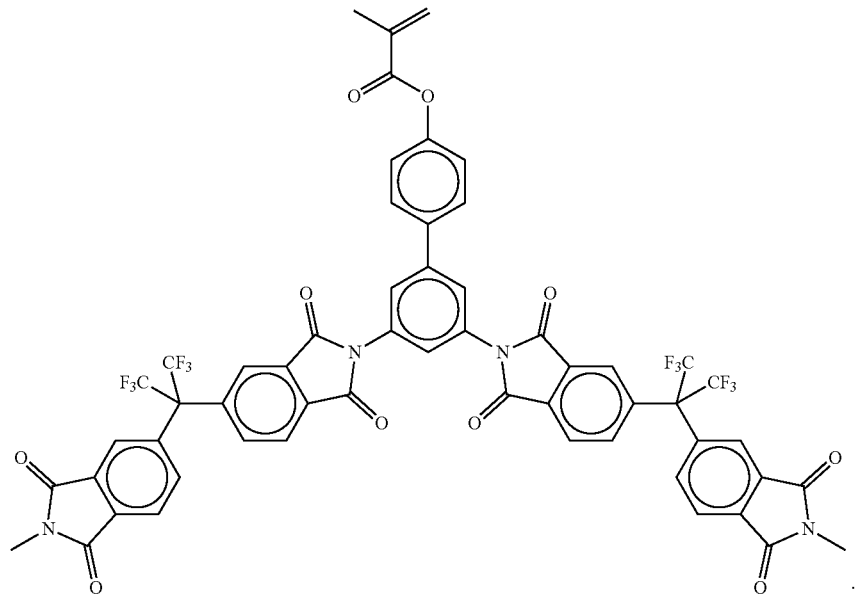
10. The liquid crystal photoalignment agent of claim 1, wherein
the compound of Formula 1 is a compound of Formula 1-2, and
wherein
of Formula 1-2 forms a reaction product with the copolymer of diamine and dianhydride and is bound thereto
[Formula 1-2]
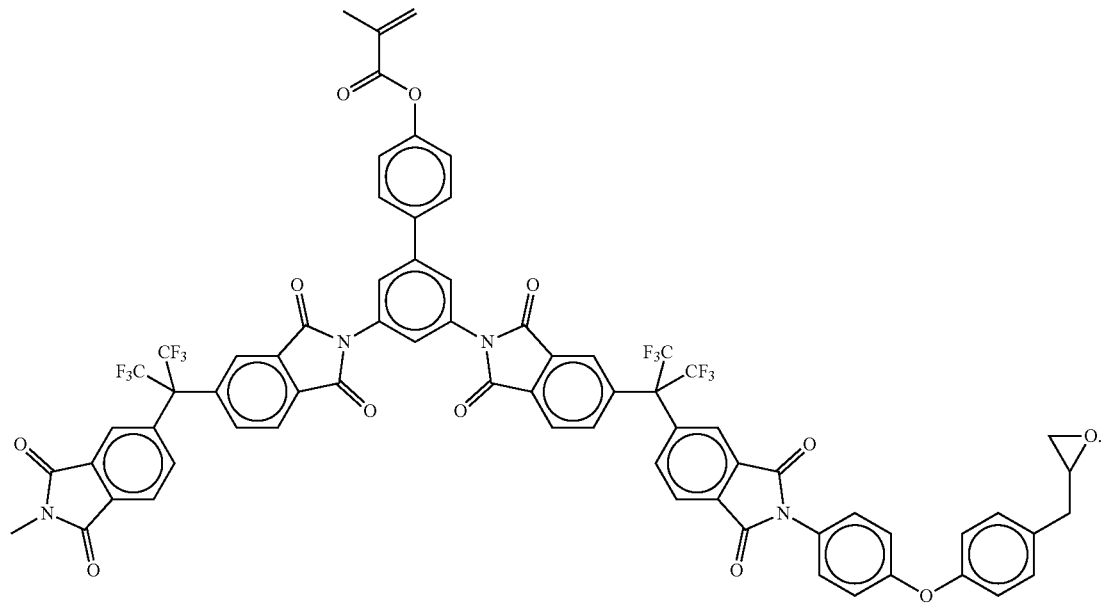

11. The liquid crystal photoalignment agent of claim 1, wherein
the liquid crystal photoalignment agent does not comprise a photoinitiator.

12. A liquid crystal display comprising:
a first substrate and a second substrate facing each other;
a liquid crystal layer disposed between the first substrate and the second substrate; and
a plurality of protrusions disposed between the first substrate and the liquid crystal layer,
wherein the plurality of protrusions comprises a photopolymerization product of a liquid crystal photoalignment agent, wherein the crystal photoalignment agent comprises a copolymer of diamine and dianhydride and a compound of Formula 1 below:

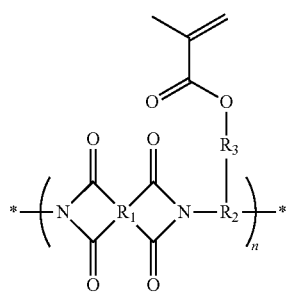

[Formula 1]

wherein,
R₁ is a substituted or unsubstituted tetravalent organic group derived from an acid dianhydride, wherein the acid dianhydride is at least one of an aliphatic cyclic acid dianhydride or an aromatic acid dianhydride,
R₂ is a substituted or unsubstituted trivalent organic group derived from an aromatic diamine,
at least one of R₁ of R₂ is substituted with CF₃ or a silyl group,
R₃ is a residue of a compound comprising a substituted or unsubstituted aromatic group having a carbon number equal to or greater than 6,
n is 1 to 5, and
* represents a point of attachment, and
wherein the copolymer of diamine and dianhydride is not miscible with the compound of Formula 1.

13. The liquid crystal display of claim 12, wherein
the liquid crystal layer does not comprise a photoalignment agent.

14. The liquid crystal display of claim 12, wherein
a protrusion is not disposed between the second substrate and the liquid crystal layer.

15. The liquid crystal display of claim 12, comprising:
a first alignment layer disposed between the first substrate and the liquid crystal layer, and
a second alignment layer disposed between the second substrate and the liquid crystal layer,
wherein, the plurality of protrusions is disposed between the first alignment layer and the liquid crystal layer, and
the first alignment layer and the second alignment layer do not comprise a photoinitiator.

16. The liquid crystal display of claim 12, wherein
in Formula 1,

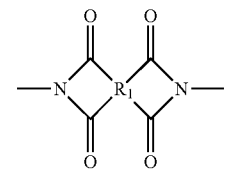

is one of Formula 2-1 or Formula 2-2:

[Formula 2-1]

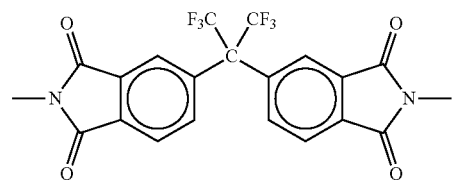

[Formula 2-2]

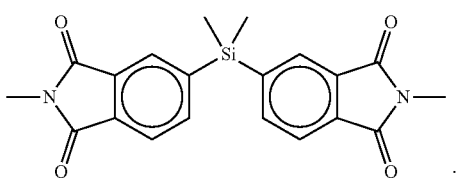

17. The liquid crystal display of claim 12, wherein
R₂ is one of Formula 3-1 to 3-7:

[Formula 3-1]

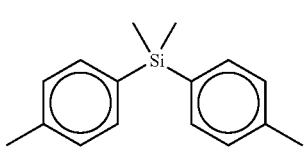

[Formula 3-2]

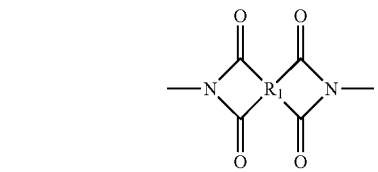

[Formula 3-3]

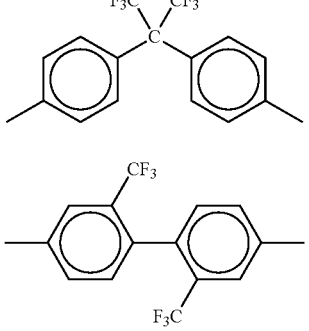

[Formula 3-4]

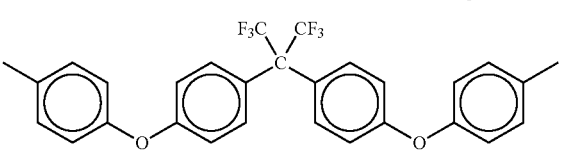

[Formula 3-5]

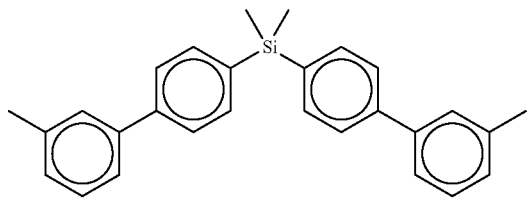

[Formula 3-7]

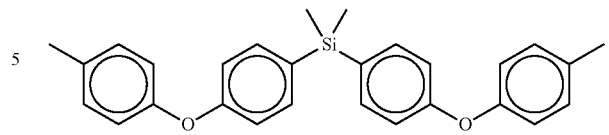

wherein, in Formula 3-1 to 3-7, the point of attachment to R3 of Formula 1 is a carbon of a benzene ring of Formulae 3-1 to 3-7.

18. The liquid crystal display of claim 12, wherein the compound of Formula 1 further comprises a group of Formula 4 at a terminal end thereof:

[Formula 3-6]

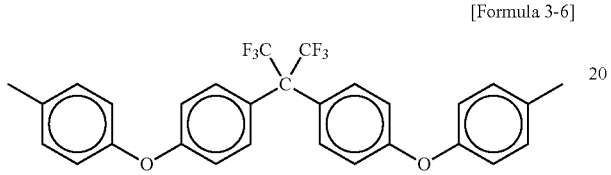

[Formula 4]

19. The liquid crystal display of claim 12, wherein the compound expressed in Formula 1 is a compound of Formula 1-1 or a compound of Formula 1-22:

[Formula 1-1]

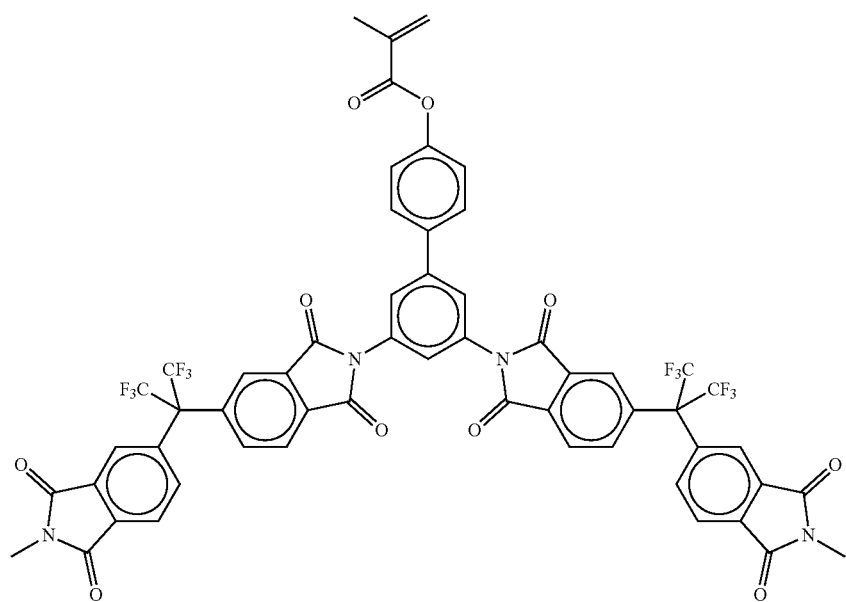

-continued
[Formula 1-2]
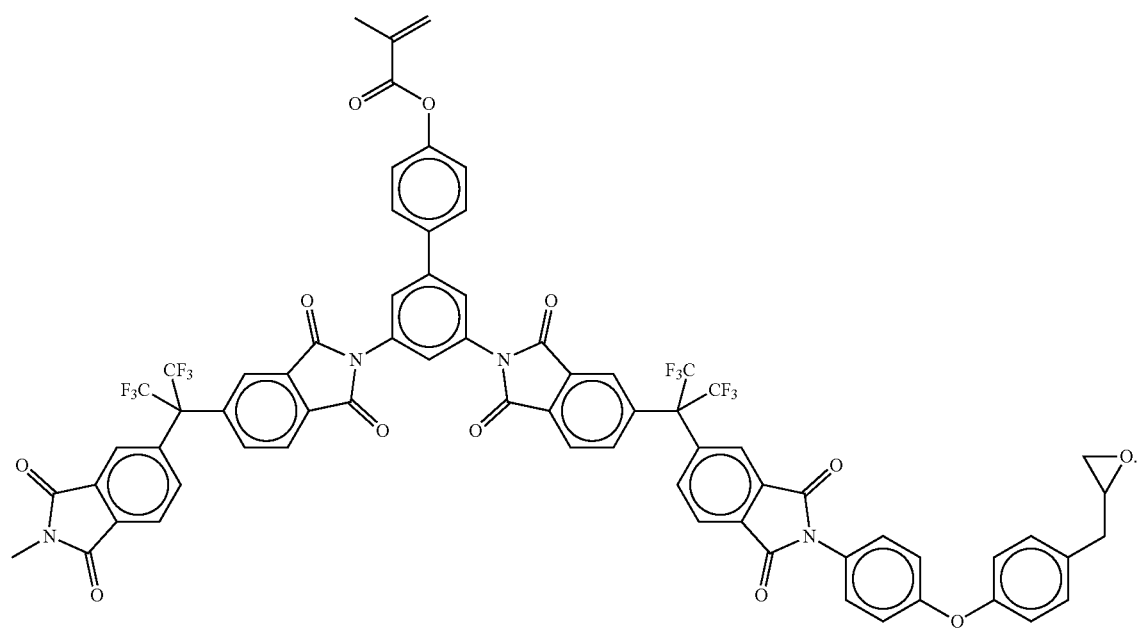
* * * * *